United States Patent
Tronnier et al.

[15] 3,642,351
[45] Feb. 15, 1972

[54] EXPANDED TRIPLET OBJECTIVE HAVING AT LEAST FOUR ELEMENTS

[72] Inventors: Albrecht W. Tronnier, Gottingen; Joachim Eggert; Fritz Überhagen, both of Braunschweig, all of Germany

[73] Assignee: Voigtlander A.G.

[22] Filed: June 16, 1969

[21] Appl. No.: 836,690

[30] Foreign Application Priority Data

June 14, 1968   Switzerland................8,895/68

[52] U.S. Cl..................350/215, 350/216, 350/220
[51] Int. Cl......................G02b 9/34, G02b 9/60, G02b 9/62
[58] Field of Search..................350/216, 214, 215, 220, 223

[56] References Cited

UNITED STATES PATENTS

| | | | |
|---|---|---|---|
| 2,855,824 | 10/1958 | Schade | 350/215 X |
| 3,128,329 | 4/1964 | Muller | 350/220 UX |
| 3,490,825 | 1/1970 | Takahashi | 350/216 X |

FOREIGN PATENTS OR APPLICATIONS

1,411,207   8/1965   France................350/220

Primary Examiner—John K. Corbin
Attorney—Blum, Moscovitz, Friedman & Kaplan

[57] ABSTRACT

A relatively powerful objective of relatively wide aperture having at least four elements of the expanded triplet-type situated in air. The objective includes a forward component made up of three elements and including a rear negative element which is followed by a rear component. The front element of the forward component has a concave hollow front surface directed forwardly toward the object and this front surface has an overcorrecting action. The various elements of the forward component provide it in its entirety with a biconcave configuration, and the limits of the ranges used for the various parts and groups of parts of the objective enable it to achieve a highly efficient optical action for an objective which has a relatively wide aperture in the range of from approximately $f/4$ up to $f/1.8$ or greater.

11 Claims, 14 Drawing Figures

FIG.3/2b
SPHERICAL ABERRATION ———    SAGITAL IMAGE SURFACE ———
SINE CONDITION        — — —    TANGENTIAL IMAGE SURFACE — — —
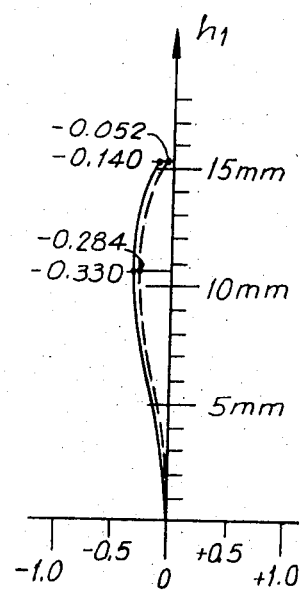
a)
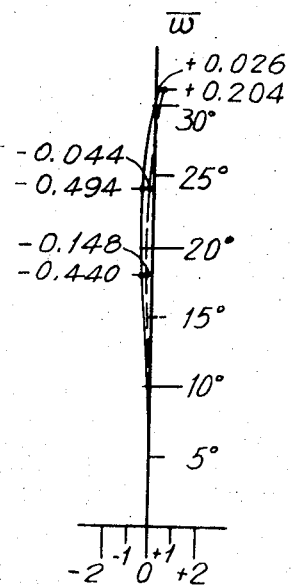
b)
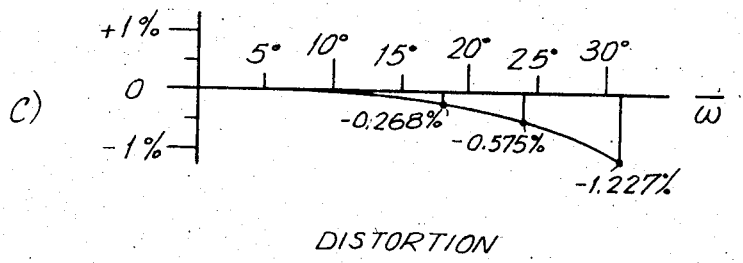
DISTORTION

FIG.3/4
SPHERICAL ABERRATION ———   SAGITAL IMAGE SURFACE ———
SINE CONDITION       — — —   TANGENTIAL IMAGE SURFACE - - -
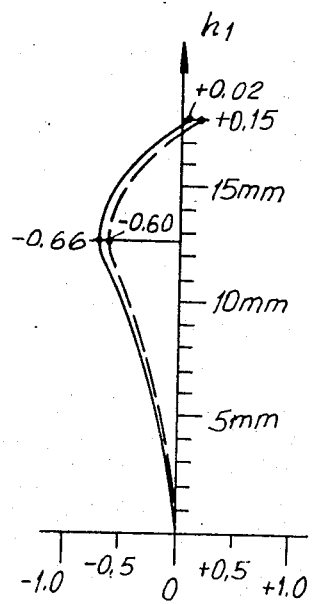
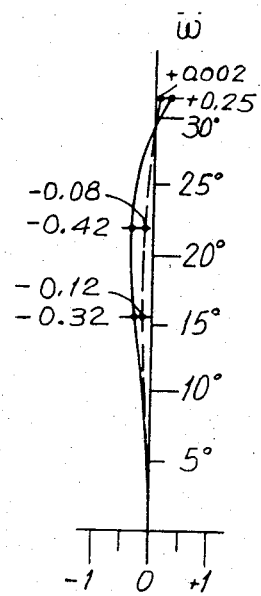
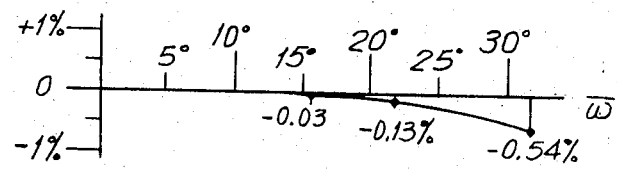
DISTORTION

SPHERICAL CHROMATIC ABERRATION

SAGITAL IMAGE SURFACE ———
TANGENTIAL IMAGE SURFACE ----

DISTORTION

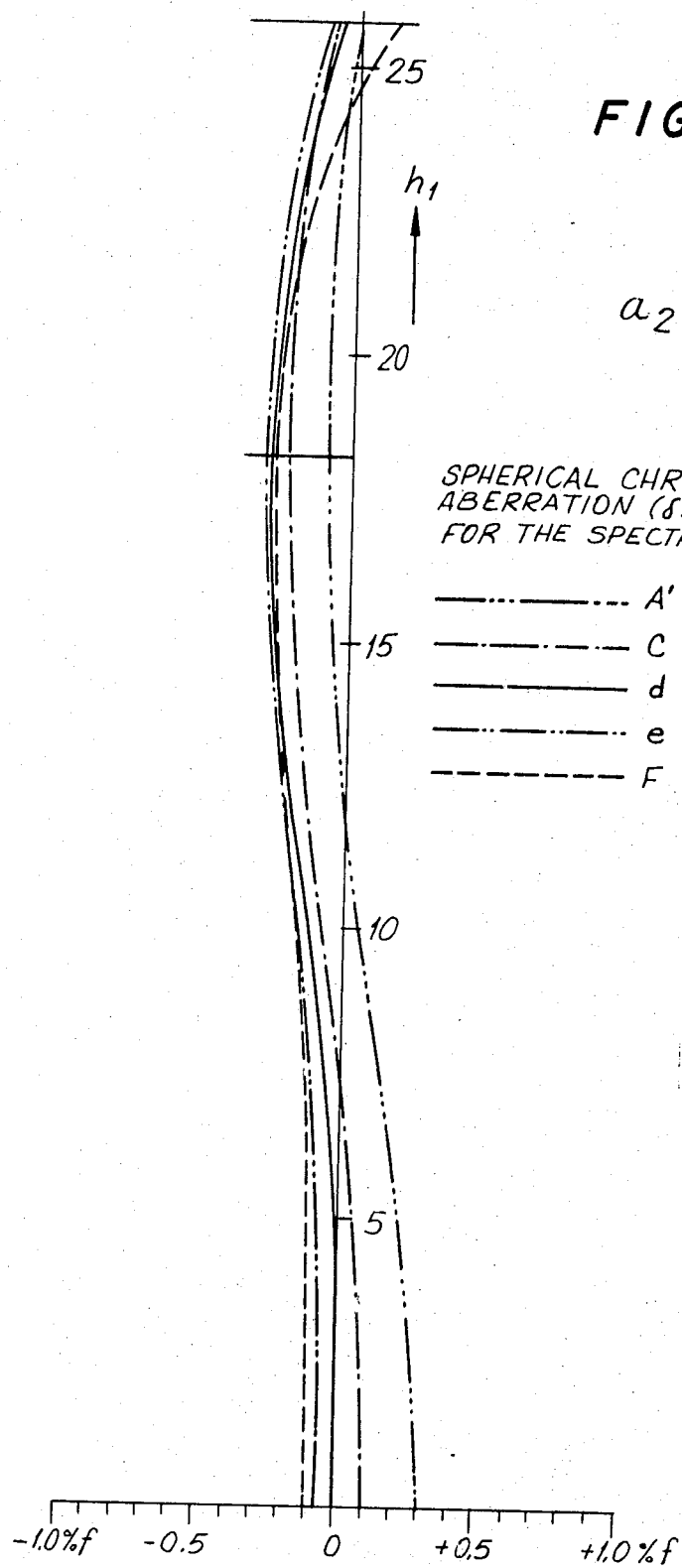

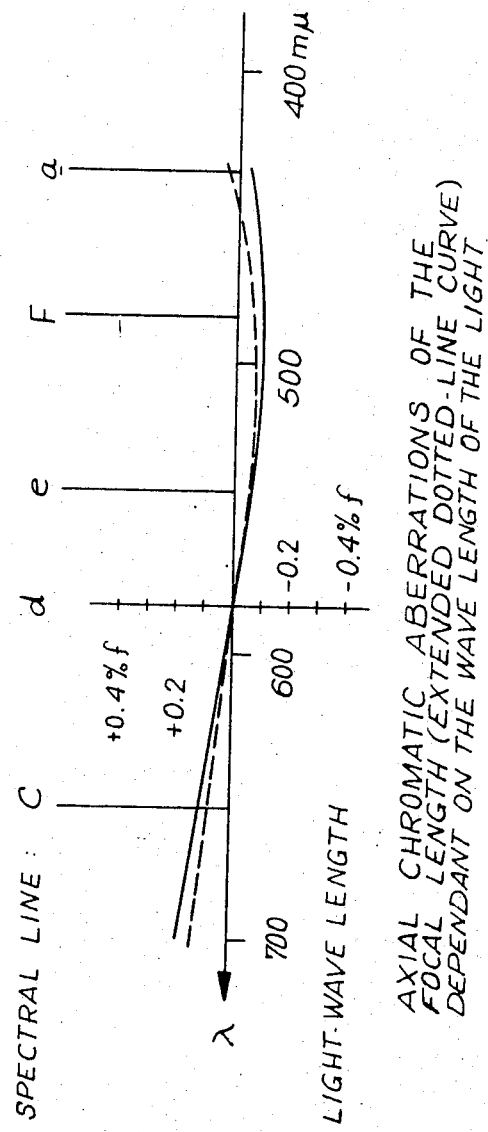

EXPANDED TRIPLET OBJECTIVE HAVING AT LEAST FOUR ELEMENTS

BACKGROUND OF THE INVENTION

The present invention relates to photographic objectives having at least four elements which are situated in air and which are of the expanded triplet type. In addition to having spherical and chromatic corrections adapted to the useful relative opening it is provided with an anastigmatic image field plane. The invention relates in particular to triplet expansions having higher relative apertures, enabling it to be used with particular advantage for camera and projector objectives the relative aperture of which is in the region from approximately $f/4$ up to $f/1.8$ or greater.

Objectives of the expanded triplet type are known in many different forms. They consist in their basic construction either of three individual lenses according to the Taylor three-lens Cook objective, or of a half-cemented arrangement of the type such as the four-lens Rudolf Tessar type or the five-lens Harting Heliar objective or even the three-cemented element six-lens structure of the Berek Hector type. Objectives of this type have also been made in the form of four expanded elements which are situated in air and which have partly cemented and partly uncemented elements derived from or related to the Ernostar and Sonnar type of L. Bertele. Both of the latter constructions have more than three components situated in air so that they are expanded triplets but in the development of fast photographic objectives they are used in the same way as the other above-mentioned three-element basic forms as the starting point for expanded lens assemblies.

The latter expanded assemblies are designed either to have an increase in the size of the relative aperture or to reduce the aperture errors or their zonal intermediate errors, which were present in the particular basic structures for the purpose of improving the imaging.

With all of these expanded assemblies, the basic objective is provided either with converging or diffusing lenses, where the expansion on the image side of the objective of a basic triplet (as was substantially proposed according to British Pat. Nos. 299,983, 320,795, and 375,723 as well as the German Gebrauchsmusters Nos. 1,374,730 and 1,405,484) did not gain any greater significance.

In contrast, from the further broadened object side of the expansion of the basic triplet arrangement there are the expanded Cook objectives of the British Pat. No. 477,424, the expanded Tessar type according to German Pat. No. 404,805, the Xenar expansion according to British Pat. No. 476,349, the expansion of the Heliar type as proposed in the U.S. Pat. No. 2,076,686 and the expansion of the Hector type according to Example II of British Pat. No. 381,135. An example for the expansion of the Ernostar type is Example I of German Pat. No. 428,657 and for an expansion of the Sonnar type of L. Bertele reference may be had to Example I of British Pat. No. 419,552.

All of the above objective designations are the known trade names of firms Taylor-Hobson, Zeiss, Schneider, Voigtlander, Leitz, and Zeiss-Ikon. Under these trade names the above lens structures have achieved in photography their worldwide specific commercial positions.

With these expansions it is in most cases possible to achieve certain improvements in the aperture-dependent course of spherical aberrations which for the entire condition of the imaging power of these objectives is effective only in the region of the axis and thus in the central image portion. Since however in the center of the image the image quality of these modifications of the triplet type are sufficient for the average requirements of the practicing photographer, the advance realized with the above expansion measures is not satisfactory since with these systems it is precisely the outer edge portions of the image field which must be provided with an improved image quality in order to bring about a true advance. The above-mentioned improvement in the imaging quality in the region of the axis of the image results to a far greater extent in a particularly apparent difference between the image sharpness at the central image region and at the edge image region so that the result is that the entire image has for many photographers a completely unsatisfactory effect.

SUMMARY OF THE INVENTION

It is accordingly a primary object of the present invention to avoid the above drawbacks.

In particular it is an object of the invention to provide the possibility of appropriately influencing the course of the lateral image surface and the aperture errors in the outer axial image field parts.

Thus, it is an object of the present invention to provide an expanded triplet type objective which has a relatively large viewing angle and which can operate very effectively with relatively large apertures.

In accordance with the invention the front element at the object side of the basic type of new triplet modification has, in contrast to front lens elements of expanded triplets known up to the present time, at its dioptrically strongest acting surface for the lateral primary bundle of rays not a relatively small but rather a relatively large ray-receiving angle with respect to its normal surfaces. This result is achieved by providing the expanded triplet objective of the present invention with features set forth in detail below.

BRIEF DESCRIPTION OF DRAWINGS

The drawings illustrate several embodiments of the new objective of the invention, and in the drawings:

FIGS. 3/2b, 3/4, 9, 10, and 11 designate various curves characteristic of the above structures of the corresponding FIGS.

DESCRIPTION OF PREFERRED EMBODIMENTS

Figure 1:
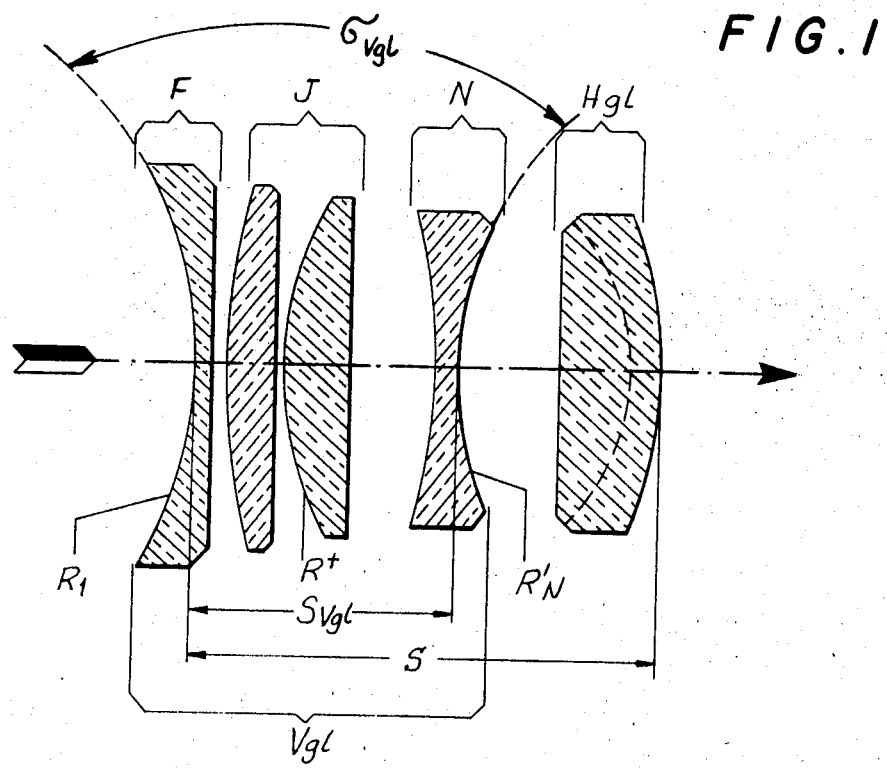
FIG. 1 is a schematic illustration of the general arrangement of the invention.

Referring to FIG. 1, it will be seen that the illustrated objective includes a rear component $Hgl$ and a front component $Vgl$. Part of this front component is formed by an inner triplet negative (N) situated in the region of the diaphragm and followed in the direction toward the image plane by the converging, positive rear component ($Hgl$). On the other, forward side, directed toward a distant object the multiple-element forward component ($Vgl$) starts at the object or front end with a forward lens F which has with respect to the length of the radius $R_1$ of its front surface an axial thickness ($d_1$) along the optical axis which is smaller than 1/7 of the front radius $R_1$ without, however, being smaller than 1/70 of this radius. This front lens F has a hollow concave front surface directed toward the distant object and acting in an overcorrecting manner so that the forward component directed toward the longer conjugate is limited at its front end by a concave dispersing surface receiving from the side rays which enter in an aberrationless manner from a distant object into the objective while also having at the opposed rear end the triplet negative N which acts in an extremely intense overcorrecting manner. This latter triplet negative N has a lens refractive power with respect to the initial aperture ($c$) of the relative aperture of the objective (which is to say the sum of its paraxial surface refractive powers divided by the aperture number of the initial opening of the objective) $\bar{\phi}(N) = \phi(N):Z$. This latter value has a negative sign and its numerical value is greater than ⅔ but smaller than 1⅔ times the total refractive power $\Phi$ (for which $f^{-1}$ is referred to). Thus, the refractive power, which is also negative, of the front concave surface radius $R_1$ coacts with this dispersing refractive power related to the aperture number at the greatest possible ray path within the forward component.

As may be seen from FIG. 1, the crest of the front surface of the front lens F, where this concave surface engages the optical axis, has a distance from the crest of the rear surface of the rear component Hgl equal to the distance S. This distance S is smaller than the equivalent focal length of the entire objective without, however, being less than a lower limiting value of 25 percent of the latter. The concave front surface of the front lens F of the forward component has a radial length $R_1$ which is greater than ⅔ of the equivalent focal length of the entire objective while being smaller than 10/3 of the latter.

The front lens F of the forward component Vgl is followed in the direction toward the inner negative lens N which is positioned in air by at least one positive lens forming an inner lens element J. This latter element J is provided with the smallest positive radius $R^+$ for all of the air-engaging lens surfaces of the forward component Vgl. This forward component has radii lengths such that the sum of the lengths of the radius $R_1$ and the smallest positive radius $R^+$ have an absolute value of between $0.9f$ and $3.8f$, where $f$ is the equivalent focal length of the entire objective. In formula form the above four combinations or relationships are as follows:

$$0.25f < S < 1.00f \ldots (1)$$
$$\tfrac{2}{3}f^{-1} < -\phi(N) < (5/3)f^{-1} \ldots (2)$$

and also $$\tfrac{2}{3}f < -R_1 < (10/3)f \ldots (3a)$$
$$0.9f < |R_1 + R^+| < 2.8f \ldots (3b).$$

With this construction of the invention, the new objective of the invention is in sharp contrast to widely used triplet expansions where the aberration-free rays which are received in the objective are influenced in an undesirable manner by the sharply convergent front surface not only with respect to spherical and astigmatic image errors but also with respect to the Petzval image surface curvature, always initially in an undercorrecting sense. These disadvantageous results of the old constructions are intensified because these converging or positive front surfaces of the older triplet expansions are hollow in a direction toward the aperture, so that the primary lateral rays, because of the direction sign with respect to the convex front surface directed toward the longer conjugate, are received in the latter only in a relatively small receiving angle which is susceptible to only a small degree of change. Therefore, any eventual substantial changes to influence the operation, which could provide a path toward a highly significant technical advance, can only be brought about with the old structures by way of extremely intense surface curvature and/or glass refractive indexes.

With the present invention, in contrast with the state of the art, it is possible to incorporate into the structure highly significant technical advances, because the hollow concave front surface of the front lens serves to influence the aberration-free rays which travel from the object into the objective initially once in an overcorrecting sense in the same way that the ray path is influenced in the region of the diaphragm by the specific dimensions of the interior negative lens N. Thus, the forward component begins and ends at both of its end surfaces with overcorrective actions of specific magnitude, and in addition as a result of the negative sign direction of the front radius relatively large and therefore easily handled light-receiving angles for the lateral primary rays can be achieved at the dispersing concave, hollow front surface which is directed toward the object.

In particular, with the objective of the invention there is the possibility of coupling in an optically effective manner the strongly overcorrecting negative surface at the side of the forward component directed toward the shorter conjugate with a weaker acting overcorrecting dispersing hollow surface at the other side of the forward component. However, this latter element brings about by its configuration an action according to which the ray-receiving angle of the particular lateral primary rays at the surface through which they pass is not only per se relatively great, but in addition it can be made even greater than the corresponding primary ray inclination angle with respect to the optical axis. Thus, beside the magnitude of the ray-receiving angle at the front surface for a particular radius of curvature, there is a progressive increase with an increasing image angle, which lends itself to a particularly significant advance.

The noteworthy dimensions of the hollow front surface of the lens F is provided with a radius $R_1$ which has a range provided with an upper limit according to a value where it is still possible to achieve an effective surface influence according to the purposes of the invention, while the lower limit prevents an excessively intense dispersive action of this hollow front surface. In this way the encountering of too intense zonal intermediate errors which reduce the imaging capabilities is opposed. This objective is also served by the upper limit of the radius of the front surface with respect to the rear element of the objective, which carries out the primary part of the positive action of the entire system. This is emphasized by the total crest distance S taken along the optical axis from the crest of the dispersing front surface of lens F to the exterior rear end surface of the entire objective which is directed toward the image plane, all with respect to the equivalent focal length $f$ as the reference unit. As soon as this crest distance S exceeds substantially the focal length $f$, the inclined rays at the front surface can easily increase to relatively large values for the magnitude of passage at this surface, so that the danger of a too large surface action at this location can result while at the same time there will be in many cases an undesirable overdimensioning of the front lens F when it is desired to avoid an unacceptable vignetting. As a result of the predetermined upper limit of the measurement formula or range, this danger is effectively prevented, while the lower limit because of the constructive requirements of a multiple-lens system of an expanded triplet type of objective is determined with the required finite lens thickness and air distances according to natural limits.

The third feature of the new constructive principle of the invention provides the measuring principle for the alternate selection of action, emphasized by the radii of curvature which are functionally interrelated, with respect to the radius $R_1$ of the hollow front surface, on the one hand, and the strongly convergent glass-air-surface $R^+$ of the element J, which follows the element F in a direction toward the inner negative element N. As was the case with both of the above measurement principles, this last principle also is kept in a range within limits taken with respect to the equivalent focal length $f$ of the entire objective.

In order to be able to achieve higher relative apertures and/or a strongly extended viewing field, there is also provided according to the invention the positive rear component Hgl at the side of the longer conjugate preceded by a lens combination, often referred to in practice as a mechanical assembly forming a common unit referred to as a forward component Vgl. This element forms the inner negative lens N which has directed toward the shorter conjugate a concave surface of radius $R_{N'}$ so that the pair of end surfaces of radii $R_1$ and $R_{N'}$ of the new forward component combination of the invention (F-N) have in their entirety a biconcave exterior configuration. These elements all have measurements as set forth below. Inasmuch as the length of the ray path between the pair of dispersing outer end surfaces of the forward component are of particularly great influence on the achieved image, the crest distance along the optical axis between the end surfaces of the forward component Vgl is very carefully predetermined, this crest distance being the length along the optical axis from the intersection of the front surface of lens F to the intersection of the rear surface of lens N. This crest distance $S_{hu}$ is relatively small with respect to the length of the radius of curvature $R_1$ of the hollow front surface of the entire objective. This feature is provided in order to avoid an undesirably large ray passage magnitude and thus an undesirably large ray-receiving angle at the dispersing front surface of radius $R_1$ for the strongly inclined lateral rays, which is to say for the imaging of the edge portions of the extended viewing field. This distance $S_{Vgl}$ is smaller than 7/12 of the absolute value of the radius $R_1$ while remaining greater than 1/12 of this radial length, so that in formula form the following relationship is obtained $$\frac{7}{12}|R_1| > S_{Vgl} > \frac{1}{12}|R_1| \quad (4a)$$

With this dimensional relationship between the front radial length and the crest distance of the forward component, the total of both of these magnitudes as the distance from the central curvature point of the hollow front surface up to the crest of the rear surface of radius $R_N'$ in the region not only of the diaphragm but also of the entrance pupil of the entire objective should not only always have a negative value but at the same time should also be dimensioned in order to achieve the desired favorable entrance angle at the forward component, in such a way that the value $(S_{Vgl}-R_1)$ is numerically greater than $0.80f$ but smaller than $3.80f$. From the above-mentioned lower limiting value there will be with increasing magnitude of this value a gradual reduction in the dioptric action of the assembly because of the accompanying reduction of the ray-receiving angle at the front surface with respect to the corresponding lateral primary ray inclination angle. Thus, in correspondence with the characteristic data of the lenses for achieving the objects of the invention at the same time the upper limit is determined, so that this measurement value $(S_{Vgl}-R_{Bq}')$ is smaller than 3.80 times the equivalent focal length of the entire objective. This relationship in formula form is as follows:

$$0.80f < (S_{Vgl} - R_1) < 3.80f \quad (4b)$$

wherein $f$ again is the equivalent focal length of the entire objective and is taken with respect to the sign.

As is apparent from the above relationships (4a and 4b), the harmonizing dimensions of the ray path length in the forward component together with the interrelated measurement of the hollow front radius directed toward the longer conjugate, for reasons of easy subsequent examination with respect to the optical axis, forms an important part of the entire invention for achieving an objective of high power as well as for achieving a large image angle, so that it is possible both for a high relative aperture and a relatively extending viewing field with the associated large openings of the ray cross section and the relatively great inclination of the rays of the lateral viewing field to achieve a very substantial elimination of the zonal intermediate errors.

One of the accompanying optical requirements is that the rear surface of the negative element at the rear of the forward component directed toward the shorter conjugate becomes effective between an extremely small percent difference between the paraxial surface refractive power $\phi P$ on the one hand and the astigmatic surface refractive power $\phi A$, on the other hand so that with extremely small inclined rays and impinging magnitudes are present at the triplet negative N while the hollow front surface directed toward the distant object together with a large surface impingement magnitude for the corresponding inclined rays has at this front surface a very large percent of the difference between the pair of surface refractive powers $\phi P$ and $\phi A$, with the construction of the invention, even though this overcorrecting action of the concave front surface is in its length a multiple of that of the rear concave surface of the forward component.

Thus, the ordinary paraxial surface refractive power is given by $\phi_P = (n'-n):r$, while the astigmatic (generalized) surface refractive power is: $\phi_A = (n'\cdot\cos j' - n\cdot\cos j):r$ wherein the symbols $j$ or $j'$ designate the receiving and refractive angles, respectively, of the inclined lateral primary rays at the surfaces which they impinge.

In order to constructively outline this action the rear dispersing surface of radius $R_N'$ directed toward the shorter conjugate of the negative lens N is determined with respect to the radius $R_1$ of the front hollow surface directed toward the longer conjugate, so that while taking into consideration the signs there is also the relationship:

$$0.4f < |R_N' + R_1| < 2.9f \quad (5a)$$

is fulfilled, according to which the sum of the radii of the latter relationship is between 0.4 and 2.9 times the equivalent focal length $f$, in accordance with the invention.

The entire forward component of the new expansion triplet of the invention has, in contrast with the known state of the art, no longer the form of a convex meniscus directed toward the distant object, but rather the form of an unequal-sided biconcave lens. In the corresponding manner the Gardner shape factor $(\sigma_{Vgl})$ is lower than 1 in an absolute region of between 1 and 0 and thus advantageously is between the value 0.45 and 0.90, with the range of measurement in a formula manner conforming to the relationship:

$$0.45 < |\sigma_{Vgl}| < 0.90 \quad (5b)$$

For practical use of the invention the manufacturer has many different possibilities for the details of the new objective of the invention, within the important limits and ranges conforming to the new principles of the invention. Thus, it is possible to provide for the front lens F, in particular and the upper limit of the range for the front radius $R_1$, a construction for the biconcave lens form having a Gardner shape factor $\sigma_F$ whose absolute value is smaller than 1 and for an equiconcave form of this lens, a value of 0. In formula form this relationship for the shape is defined as:

$$0 \leq |\beta_F| \leq 1 \quad (D1)$$

The greater the extent to which the constructor provides the front lens F with unequal sides the greater the increase in the absolute value of $\sigma_F$ which becomes equal to 1 for a planoconcave shape of this lens. With increasing of sharpness of curvature of the hollow front surface of radius $R_1$, the builder of the objective will also often advantageously provide for the rest of the system which forms the forward component Vgl at the rear surfaces thereof even sharper curvatures, so that the Gardner shape factor of the front lens F may become greater than 1 and the lens itself will then have the form of a meniscus. In this case the builder has a range for the Gardner shape factor which in the form of a formula is as follows:

$$1 \leq |\beta_F| \leq \infty \quad (D2)$$

With this construction the rear surface of the front lens which is directed toward the object has in the same way as the hollow front surface a negative radius sign and the lens form has now gone over from the biconcave or concave-plane form into a meniscus form. In the course of such a continuous shaping of the rear surface of the front lens of the objective, the latter increasingly takes the configuration of a negative meniscus, so that then it will go over the zero lens of Hoegh to a positive meniscus. Thus, the Gardner shape factor in correspondence with the Gardner shape factor definition (I.C. Gardner: Applications of The Algebraic Aberration Equations to Optical Design, Sc. Pap. Bureau of Standards No. 550, Washington 1927, Page 83, FIG. 2) first in the positive sign region from 1 in the direction of ∞, increases for the zero lens to ∞, and then proceeds from the latter in the negative sign direction back in the direction toward the value $-1$, without however reaching the latter value.

Thus, an important part of the invention resides in the fact that the builder of the lens within the framework of the constructive principles of the invention has a wide range of freedom in the particular form which the new objective can take for purely practical purposes, when the front lens F is provided, for example, with an inner pair of adjoining surfaces, which is to say is constructed as a multiple lens, so that the imaging capabilities throughout the entire objective can be of an even more corrective nature. Such inner neighboring pairs of surfaces can take either the form of cemented surfaces, or, in accordance with the preferred purpose of the required radial equality, with an air space enclosed between these surfaces. This latter type of construction of adjoining lens surfaces has in practice since the industrial introduction of reflection-reducing transfer surfaces for outer surfaces of optical elements, found more and more acceptance and can thus, of course, be included within the framework of the present invention in connection with the practical carrying out of the same. For unequal radii of such neighboring surfaces and the air gap enclosed therebetween, there will of course be the same freedom discussed above with respect to the lens components which define the air gap therebetween, so that the air lens form can follow not only the relationship D1 but also the formula definition D2, without going beyond the constructive principles of the invention. Such an air space enclosed at this location should have along the optical axis a length ($\delta_i$) greater than zero but not exceeding 20 percent of the equivalent focal length of the entire objective, so that in formula manner this relationship is as follows:

$$<\delta_i<0.20f....(D3)$$

The adjoining lens surfaces which enclose this air space should only appear as long as a true inner neighboring pair of surfaces, in accordance with the refractive power of the air lens enclosed ($\phi_i$) in a measured relationship of equivalent refractive power ($\Phi$) and thus, absolutely calculated, less than half of the latter. In the form of a formula definition, this relationship is:

$$0<|\phi_i|<0.5\Phi....(D4)$$

In the event of the arrangement of a second enclosed and therefore noncemented form of neighboring surfaces, there will apply in an analogous manner, for the axial length thereof ($\delta_{ii}$) and for the refractive power of the enclosed air lens ($\phi_{ii}$) also the above relationships.

Figure 8:
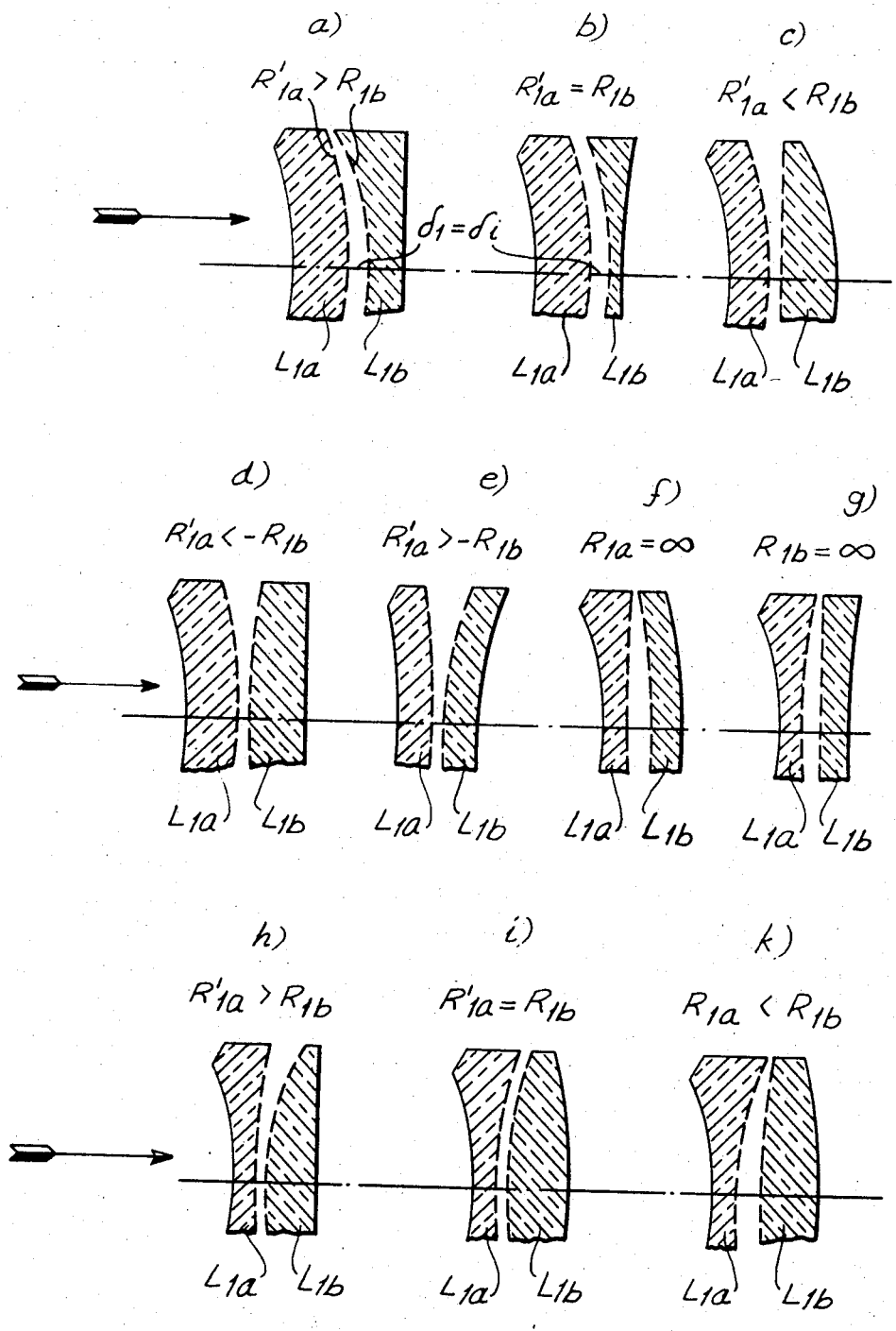
FIG. 8 schematically represents in parts $a$–$k$ various combinations of lens distributions.

With an arrangement as described above, making use optically of different divisions for the front lens at the object end of the objective, with respect to dispersion and/or refractive index properties of the lens material as well as making use of additional inner radial differences, there is always at the lens element which has the front hollow surface of radius $R_1$ a positive, converging meniscus while the dispersing front surface of radius $R_1$ is immediately followed by a surface part of the inner pair of surfaces with a radius also of a negative sign which is smaller or approximately equal to $R_1$. In the event that the radius of the surface immediately following that of radius $R_1$ is, however, continuously greater, then this front lens part of the converging meniscus initially will go over into the nonrefractive power and then further into a negative meniscus, so that there will then be further over the form of a concave plane lens. After going over to the positive curvature sign there will now be a decreasing radial length of this rear surface with a biconcave form being achieved. The following lens element will then, with a corresponding eventual lack of radial equality for the enclosed pair of surfaces, undergo a corresponding change in form in the same dependence upon the form of its rearwardly directed second radius of curvature which in accordance with the above can also be the partial radius of a second pair of neighboring surfaces within this multiple-part assembled front lens F for the front component V$gl$, as illustrated in FIG. 8.

Such lens divisions are, however, of course not necessarily limited only to the front lens F. Such divisions can also be situated in an entirely independent manner at any other part of the interior of the new objective, in accordance with the single or multiple use of extremely high refracting modern glasses (in particular for lenses with converging refracting powers) or in accordance with a selection of extremely low refracting glasses for one or more dispersing lenses according to the proposal of German Pat. No. 581,472. Features of this latter type can be included without going beyond the present invention. Thus, with a division of this type an inner pair of adjoining surfaces can be provided for the negative lens at the side of the longer ray distance converging lens, as proposed by H. Focke (German Pat. No. 291,916). Also the negative can be provided with an inner pair of adjoining surfaces, which, as proposed by H. D. Taylor (German Pat. No. 86,757) is hollow in a direction toward the shorter conjugate, or which, according to the proposal of L. Bertele (British Pat. No. 193,376/1922) is convex in a direction toward the image. With a division of the rear component H$gl$ it is also possible to provide a cementing somewhat according to the proposal of P. Rudolph (German Pat. 142,294) with a convex cemented surface directed toward the diaphragm area, or according to the proposal of H. W. Lee (British Pat. No. 209,371/1923) with a convex cemented surface directed toward the image, with both of these partial lenses having opposed signs. Opposed signs for both partial lenses or the rear component are also shown according to the proposal of F. Urban (U.S. Pat. No. 1,474,743), where, however, the inner pair of adjoining surfaces of the rear component enclose a finite air distance, which is also the case with the proposal of W. F. Bielicke (U.S. Pat. No. 1,540,752). With this latter arrangement, however, both of the partial lenses of the rear component are provided with a positive sign, and the airgap which forms an air lens therebetween has a strongly positive refractive power. The division of the negative goes even further according to the converging rear component in Biotessar of W. Merte (German Pat. No. 404,805), where the rear component is made of a pair of positive lenses situated in air, of which the part of the lens at the side of the image is additionally provided with a pair of cemented surfaces and thus forms a doublet. Two other forms of three-lens divisions of the rear component at the image end of the objective are shown in German Pat. No. 451,194 of W. Merte, which, however, forms with this proposal a completely cemented triplet lens. Of course, when making use of the new constructive principles of the invention it is also possible to follow the old proposal of M. Berek, to include neighboring pairs of surfaces not only in the converging lens situated before the negative but also in the negative itself as well as in the rear component which follows the negative, without having the optical builder go beyond the routine practical use of old partial proposals for expanded triplet objectives, as long as one or more of these available multiple possibilities in its details conforms to the principles of the invention.

The data tables which follow show selected details for particular objectives of the invention, wherein besides photographic objectives also projective objectives and objectives for microprojection are provided. The necessary discrete selection therefore covers a broad range of relative apertures and different viewing field extensions, so that besides demonstrating the wide freedom of selection available to the builder from among the most widely different refractive indexes, there is also very clearly demonstrated that the glass refractive numbers with a value $n_d$ of less than 1.55 can also be used as well as the average value of around 1.65 up to those which are over 1.75 without going beyond the present invention.

For the front lens F as well as the negative N which is in air, for the purpose of a simple comparison in the following data tables of particular examples of the invention, no references made to the use of multiple lens elements at these locations, so that both of these lenses in the following tables are provided in their simplest form, namely as one-piece lenses. Also, for the same reasons, the tables refer only to such examples where the front lens directed toward the distant object is formed as a meniscus, so that the Gardner shape factor has an absolute value in the region of over 1 toward ∞. In accordance with the above considerations all of these partial sections proceed from the region of the construction of the invention to three different lens forms for the front lens, namely for the form of a negative meniscus as well as for the form of a strictly zero lens of Hoegh and for the form of a positive meniscus where from the side of the longer conjugate there is calculated to the second location a radius of shape curvature and thus a smaller radius than that of $R_1$ the hollow overcorrecting front surface which is directed toward the distant object.

Objectives which start with a hollow end surface are in themselves not new, but they are, on the other hand, in no way interchangeable with the present invention since these old proposals have completely different purposes, or in other words completely different imaging purposes, for the specific fulfillment of which the known lens structures were created. These old proposals thus are concerned on the one hand with image reversal systems for imaging at a magnification ratio of form 1:1 up to approximately 4:1, and thus for photographing or reproducing at the natural size as well as for copying of lenticular color film with small enlargement, and in the latter case this reversing objective is formed as a teleccentric system. With these known objectives there is therefore for the observer of such an objective the concave front surface not considered as being directed toward the distant object but rather this radius is a limiting radius of the objective with respect to the shorter conjugate of the entire imaging assembly, since the longer conjugate of such a system in contrast with the present invention is not at the object side but in the interior of the image system, as is readily apparent from the imaging and data of, for example, British Pat. No. 707,155, U.S. Pat. No. 2,855,824 as well as Swiss Pat. No. 346,706, and as can be mathematically calculated, whereby with such objectives (FIG. 2, Data Table B) at the cemented elements ($L_3$, $L_4$) of the part I there is almost a parallel ray path. For the strictly parallel ray path between the radii $r_5$ and $r_6$ this front section with $s_1 = -1.33f$, so that the corresponding hollow front surface has a radius $r_1$ which is not concave toward a distant object but rather is convex toward the longer conjugate between $r_5$, $r_6$.

Figure 2:
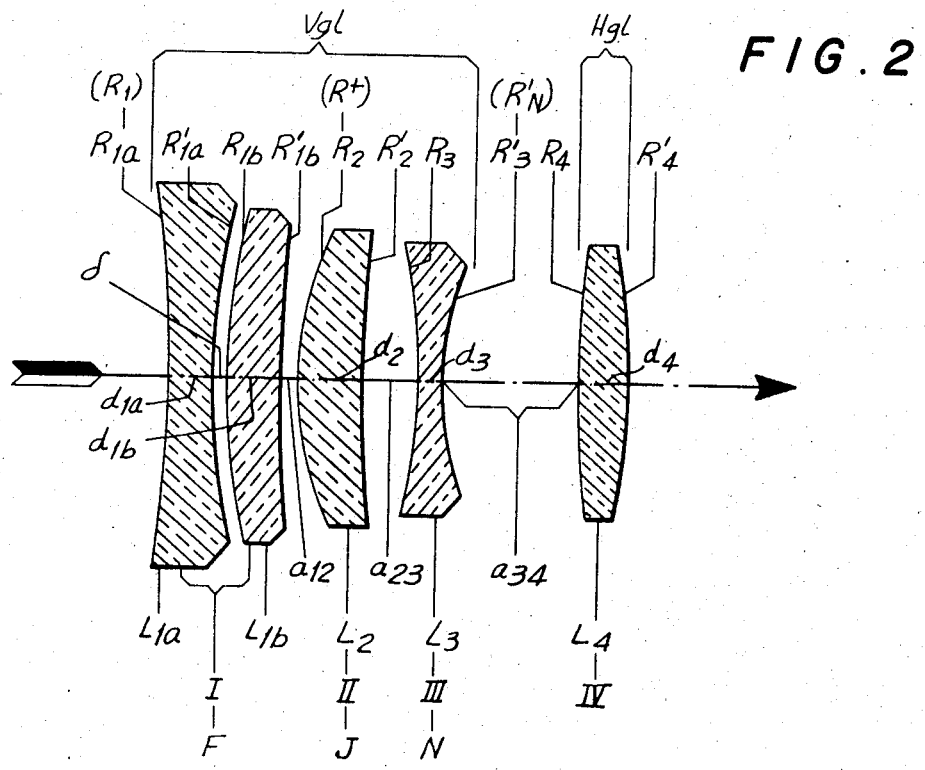
FIG. 2 is a schematic representation of another embodiment showing all of the various designations for the characteristic features of the illustrated components.

Thus, there is further for the bundle of rays adjacent the axis with the objective of FIG. 2 of British Pat. No. 707,155 the parallel ray path between surfaces $R_7$ and $R_8$, while the end hollow surface is of radii $R_1$ and $R_{14}$ correspondingly, in contrast to the present invention, not hollow or concave toward the longer conjugate but rather convex and thus these concave sides are directed not toward the distant object but rather toward the image region which in the particular example is at $-0.08747$ before the radius $R_1$ and at an amount $-0.08747$ behind the crest of the radius $R_{14}$. On the other hand, beside these special systems for photographic reversal there are a few special wide-angle objectives which are known where at the side of the longer conjugate there is a concave front surface which in the case of British Pat. No. 848,375 and British Pat. No. 850,153 forms the outer limiting surface of an assembly which forms a front negative of a wide-angle objective of a type of reversed telephoto system. Thus, in this case there is not only a completely different purpose as contrasted with the present invention, but also this older objective has for the total distance between the end crest a value of greater than five times the equivalent focal length $f$ which in one case even exceeds a value of $7f$, thus being in strict opposition to the principle of the present invention.

A further objective with a hollow or concave front surface is proposed in German Pat. No. 645,202 of W. Merte, where a simple and assembled Hoegh type of meniscus is put together in a double objective in such a way that in contrast to the Hoegh proposals the converging convex surfaces oppose each other rather than the hollow surfaces, and the diaphragm is situated between these bulging surfaces, which in addition are formed as aspherical surfaces in order to achieve a sharp image. This old proposal was further developed later by W. Merte in order to achieve a practical use, and thus provide a multiple-part form of both of the opposed positive meniscuses with their bulging surfaces, as described in British Pat. No. 487,712. In accordance with the latter the pair of converging meniscuses are each made up of three cemented individual lenses and at the same time the diaphragm is situated between the pair of positive meniscuses, with the latter at the same time being in the form of a Dagor anastigmatic lens. W. Merte has in the same patent further proposed to include in this objective at the image side additionally a field lens of very low positive refractive power ($\phi_{field\ 1.} < 0.1\Phi$) but of extremely great axial thickness and great diameter, so that the image output of such a system could be adapted at least approximately to practical requirements.

In a departure from these lens forms, there are the modifications forming the Petzval portrait objectives, which are provided on the object side with only an extremely thick negative meniscus in order to have a small image field of approximately 15° to 25° angular extension, for the purpose of reducing the very undesirable Petzval curvature even for such small viewing fields. With this variation the objective begins at the side of the longer conjugate also with a hollow, concave surface, but in contrast with the invention at the same time with the negative lens which reduces the Petzval total, so that there is an extremely great difference between the sole proposal and the present invention. As set forth above, the new arrangement is designed for expanded triplets as set forth in the introduction without any basic change in the sagital and tangential image surfaces for eliminating spherical and chromatic image errors and for a flattened image field in the lateral viewing field as well as using absolutely opposed shifting and at the same time substantial improvements of the higher order aberrations in the lateral viewing field. Thus, it is precisely these possibilities included in the invention for manipulating the higher order aberrations which are of basic significance for the advance of the state of the art. For this purpose the above opposed shifting of both astigmatic image surfaces and the range included therebetween is to be considered in the viewing field range laterally of the optical axis. This length which is included between the image surfaces is not necessarily to be used with a flattening of the image surface but also can be adapted to a nonplanar configuration while at the same time eliminating to a large extent the astigmatic adjusting differences between both image surfaces and thus the astigmatism itself. In the next following data tables this possibility is exemplified in detail. A proposal basically opposed to the present invention is illustrated in the above-mentioned modified Petzval objective in: Photographic Optics by Arthur Cox, Focal Press, London and New York, 13th Edition, 1966, Page 237, in FIG. 82 (e) where the front lens thickness is a third of the length of the radius of the hollow surface directed toward the object.

From this lens assembly of the above Petzval modification type, the reversed telephoto type and the inverted double meniscus differ from the new objective in that the negative N situated in air at the region of the diaphragm has for its entire specific refractive power a value which is between that of the front lens F and the rear component H$gl$ and forms a fixed component of the present invention since it is only through the inclusion of this element in the entire objective that the forward component combination (F–N) directed toward the distant object is created with its biconcave form and with its inner determining elements which have the ranges set forth below. Thus, the optical significance of the negative N should not be overlooked and is of all the more ready availability to the person skilled in the art than the negative of the known triplet types and their expansions which basically are designed for elimination of spherical and chromatic deviations as well as for reduction of the Petzval image curvature and thus forms an important part of the special type of expanded lens installation of the present invention.

The same basic difference also resides with respect to the objective of H. E. Taylor according to British Pat. No. 3799/1912. In this latter patent there are a pair of halves of a Gauss double objective inverted with respect to each other with the diaphragm situated between the bulging convex surfaces which are directed toward each other, and in this arrangement both halves of the dispersing doublet define between themselves at their inner adjoining surfaces a finite airgap of meniscus form, as is also the case, for example, in the normally setup half at the object side of the Gauss double objective of U.S. Pat. No. 2,106,077. This Taylor objective has thus no negative N situated in air in the region of the diaphragm, and also it does not have any of the other features of the present invention.

Referring to FIG. 1, the lens F is at the object side of the forward component V$gl$ and the lens N is the negative lens situated in air while the rear component H$gl$ is the last in the direction toward the shorter conjugate following the negative N and forming a converging or positive rear component. Furthermore, FIG. 1 illustrates in a row the characteristic radii of curvature, namely the radius $R_1$ of the hollow front surface, the smallest positive radius of curvature $R^+$ of the interior element J of the forward component Vgl, as well as the rear dispersing surface having the radius $R_N'$ of the negative lens N and the crest distance $S_{nw}$ between the lens elements F–N providing the outer radii $R_1$ and $R_N'$ which form the outer biconcave configuration for the forward component while the crest distance for the entire objective is shown at S.

In FIG. 2 the series of symbols for the individual lens components and radii of curvature, thickness and air distances are shown, with the front lens F of this embodiment having a pair of elements enclosing between themselves an airgap so that this front element F is divided into the pair of lenses $L_{1a}$ and $L_{1b}$ with the air gap therebetween having an axial length $\delta$, this divided front lens being followed by a positive, converging element J of the forward component made up of the individual positive lens $L_2$, whose convex front surface has the sharpest radius of curvature $R^+$. This element J is followed by the negative N which in turn is followed by the rear component Hgl which are formed as individual lenses, respectively. Thus, FIG. 2 is an enlarged illustration of an objective having a relative aperture of 1:3.8, where the three elements (II,III,IV) which follow the front element (I) are embodied in both converging lenses with the new highly refractive glasses forming basic triplet types, as set forth for the first time in U.S. Pat. No. 1,987,378.

Figure 7:
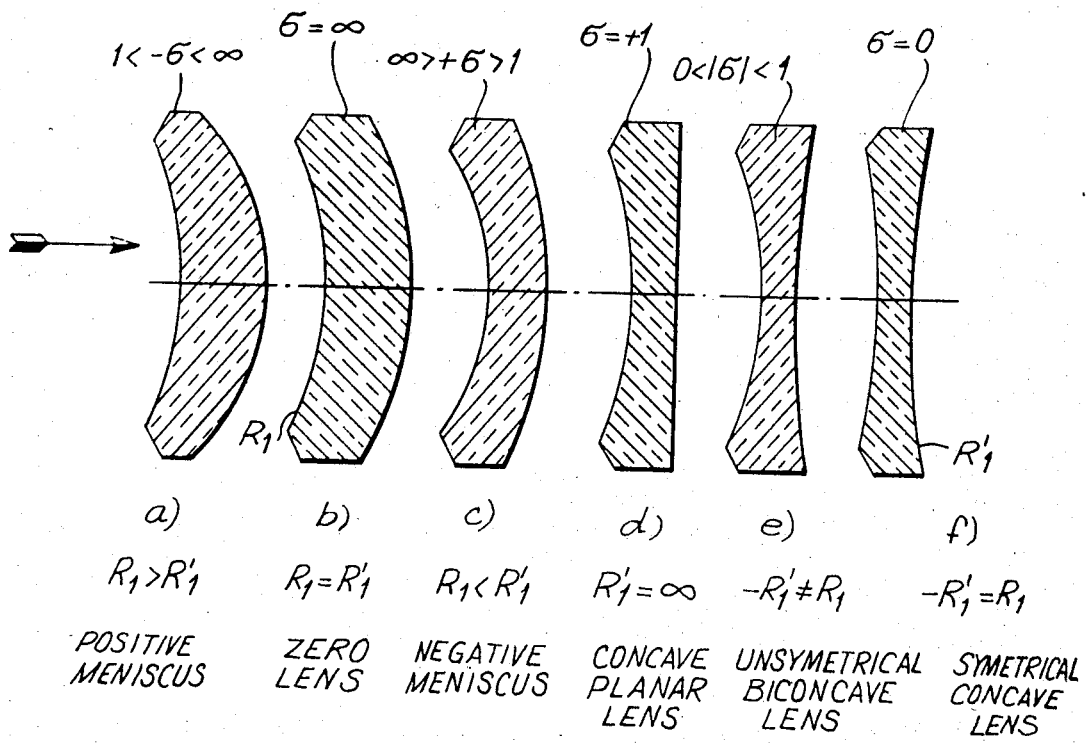
FIG. 7 schematically illustrates different front lens shapes accompanied by corresponding Gardner shape factors.

Referring to FIG. 7, the different front lens shapes are schematically illustrated, as referred to above. FIG. 7 shows with corresponding Gardner shape factors the primary lens forms in the examples $a$–$f$ of FIG. 7. Thus, in harmony with the arrow shown at the left of FIG. 7, from the left towards the right there are a continuous successive change in the shapes of the several lenses illustrated. The radius of curvature at the lens surfaces directed toward the left where the light is received are indicated by the unprimed radii R while at the light-exit side of each lens the surface radius is indicated by the primed symbol $R'$. With the progressive change of curvature of the several lenses at their front surfaces directed toward the object the front lens $L_1$ has according to part $a$ (of FIG. 7) the form of a positive meniscus, which with increasing flattening of the rear side then goes over into the zero lens of part $b$ (of FIG. 7) and then according to part $c$ (of FIG. 7) to a negative meniscus. The progression from the zero lens to the negative meniscus provides for the sign of the shape factor a positive value. With further flattening of the rear surface the lens progresses from a negative meniscus to a concave-planar lens as shown in part $d$ (of FIG. 7), and then in further progression of the changing shape into the form of an initially unequal-sided biconcave lens as shown in part $e$ (of FIG. 7) until finally there is an equal-sided form of equiconcave lens as shown in part $f$ (of FIG. 7). With this progression of shapes as shown from parts $(c)$ to $(f)$ of FIG. 7, the Gardner shape factor progresses in the positive region and reduces progressively from the infinity from over the value 1 up to zero and with a further change in the shape in the same direction would then progress from the equiconcave lens form again to the unequal biconcave lens form whose rear radius would then have a sharper curvature than the front radius so that in this way the Gardner shape factor with a corresponding change in sign would progress from zero in a direction toward $-1$ without reaching the latter value.

The lens divisions referred to above with the parts of the lens enclosing an airgap between themselves is shown in FIG. 8 where by way of example this construction is shown for the hollow front lens $L_1$ directed toward the distant object at the object side of the forward component. This lens is thus divided by the inclusion of the inner pair of adjoining surfaces forming the pair of partial lenses $L_{1a}$ and $L_{1b}$, where in correspondence with the selected designations the neighboring pair of surfaces have radii of curvature $R_{1a}'$ and $R_{1b}$. The axial distance eventually included between these neighboring surfaces has the designation $\delta_l$, since it is within the lens $L_1$. For any desired lens $L_l$ at any location there will be between such a pair of neighboring surfaces a distance in correspondence with the above designated distance $\delta_l$.

In FIG. 8 there are illustrated ten different possibilities of including air spaces between adjoining pairs of surfaces. These are schematically illustrated in parts $(a)$–$(k)$ of FIG. 8.

Thus, referring to parts $(b)$ and $(i)$ of FIG. 8, these parts illustrate a pair of adjoining surfaces of equal radii and equal directions and magnitudes, so that eventually such surfaces are suitable for cemented joining of the surfaces. In the other eight parts of FIG. 8 the illustrated adjoining surfaces enclose finite gaps which are to be considered as included within the invention with these airgaps included between the adjoining surfaces not only forming air lenses but also a light-permeable filling medium corresponding to a known modern transparent plastic, so that such a transparent plastic may be used to fill these spaces, so that a plastic lens may be considered as included between the pair of adjoining surfaces shown in dotted lines in the several examples of FIG. 8.

Moreover, the invention includes those forms of adjoining surfaces which are not particularly emphasized in FIG. 8 such as an unillustrated equiconcave form. In FIGS. 3–6 the illustrated examples have only a simple individual reference to the illustrated components for the sake of increasing the clarity of the illustration, while the data tables have detailed designations which always follow the numbering sequence from the side of the longer conjugate toward the side of the shorter conjugate. The particular embodiments of the following examples are taken with respect to a predetermined focal length of $f=1$ or $f=100$ mm., and in a corresponding manner the radii of curvature as well as the lens thicknesses and air distances measured along the optical axis are given with respect to the corresponding unity or millimeters. The accompanying refractive indexes $(n)$ of the glass are taken with respect to the $d$-line of the helium spectrum of 5,876 A. wavelength. The color dispersion of the particular gas used is partly characterized by the Abbe number $v$ and partly by the color dispersion itself, insofar as the examples are to be considered not only for monochromatic light but also for broader spectral regions.

In the following Example 1 the basic form of an objective of aperture 1:3.9 is given, which illustrates the simplest case of the invention for a lens assembly of four individual lenses, where the basic correction is in the region of the third power order and thus the basic assembly of the objective is suitable for photographic picture-taking or projection. Moreover, for didactic reasons the positive converging lens situated between the front lens F of low refractive power and the negative N is taken to be a plano-convex lens having the limiting form between a positive meniscus (with radii of the same sign) on the one hand and a biconvex lens (with opposite radii signs) on the other hand. Moreover, with the last radius $R_4'$ there is a surface refractive power which is the same as the equivalent refractive power of the entire objective, so that the rear component Hgl serves as the primary carrier for the real image and is preceded by constructive elements which serve practically as the supporting elements for image error correction.

| Example 1 | | Data Table 1 | | |
|---|---|---|---|---|
| $R_1 = -0.69$ | $f = 1$ | $s' = 0.83$ | | |
| $R_1' = -0.71$ | $d_1 = 0.037$ | 1.52/57 | (F) | |
| $R^+ = R_2 = +0.23$ | $a_{12} = 0.013$ | Air | | |
| $R_2' = \pm$plano | $d_2 = 0.046$ | 1.62/57 | (J) | (Vgl) |
| $R_3 = -0.78$ | $a_{23} = 0.037$ | Air | | |
| $R_N' = R_3' = +0.23$ | $d_3 = 0.013$ | 1.61/37 | (N) | |
| $R_4 = +1.99$ | $a_{34} = 0.100$ | Diaphragm space | | |
| $R_4' = -0.65$ | $d_4 = 0.030$ | 1.65/51 | | (Hgl) |

Figure 3:
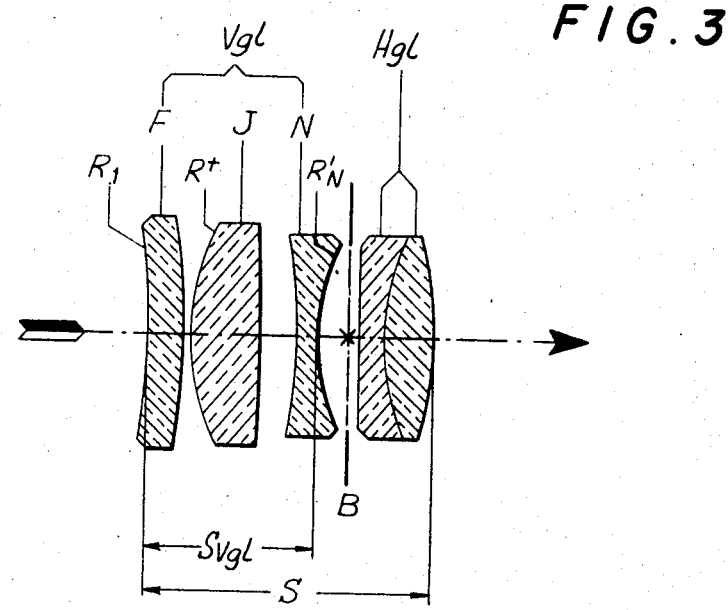
FIGS. 3–5, 6a and 6b are respectively further embodiments conforming to data tables referred to below.

In the following data tables there are three further examples which in correspondence with FIG. 3 is made up of four components situated in air with one which forms the rear component H$gl$ directed toward the shorter conjugate being made up of cemented elements. For the purpose of showing the above embodiments of a front lens F, there are illustrated in sequence in Example 2 a form having a negative meniscus configuration while in Example 3 the form corresponds strictly to a Hoegh zero lens and finally in Example 4 there is the form of a positive meniscus. For Example 2 there are a pair of data tables which demonstrate that the fine corrected form often differs only to a small extent from the basic form.

In the following table 2a there is an objective according to the invention which in the region of the third power is corrected monochromatically and has a relative aperture of approximately 1:3.5 as well as what should be considered a viewing field diameter of approximately 87.5 percent of the equivalent focal length, corresponding to a diaphragm inclination angle $\bar{w}$ of 31° for an inclined primary ray at the image edge point. In the following table 2b there is a finely corrected form for a focal length of $f=100$ mm. which is provided for a relative aperture of 1:3.4. The advance which is achieved with this arrangement may be seen from the accompanying curve sheet designated FIG. 3/2b which corresponds to a very large extent with the original Rohr illustration of aberrations and was determined in accordance with exact calculations where the part (a) shows the spherical residual errors, the part (b) the curves of the astigmatic image surfaces while part (c) shows the curves of the signs, also in direct conformance with the determinations of M. v. Rohr.

Thus, with Example 2, the hollow front lens F has the form of a negative meniscus. Its refractive index ($n_1$) is greater than 1.62 and at the same time has a magnitude approximately equal to the arithmetic average value of the refractive indexes of both of the interior dispersing lenses. The refractive indexes of both of the interior dispersing lenses. The refractive indexes ($n_2$ and $n_5$) of both of the strongly refracting positive lenses ($L_2$ and $L_5$) are greater than 1.73. The objective is provided for image unity where the greatest deviation of the spherical zonal error for the above initial aperture is smaller than 0.375 percent $f$ and the positional deviation of the sagital and meridional image point from the Gauss image plane is less than 0.5 percent $f$, where $f$ designates the equivalent focal length of the entire objective. The sign is slightly negative and remains at an absolute value within the entire viewing field under 1.25 percent for the distant object.

EXAMPLE 2 DATA TABLE 2a

[$f=1$; $s_\infty'=0.8f$]

| | | | |
|---|---|---|---|
| $R_1=-0.980$ | $d_1=0.043$ | $n_1=1.643$ | (F) |
| $R_1'=-0.998$ | $a_{12}=0.007$ | | |
| $R^+=R_2=+0.425$ | $d_2=0.123$ | $n_2=1.755$ | (J) |
| $R_2'=+3.650$ | $a_{23}=0.060$ | | |
| $R_3=-0.963$ | $d_3=0.043$ | $n_3=1.673$ | (N) |
| $R_N'=R_3'=+0.350$ | $a_{34}=0.070$ | Diaphragm space | |
| $R_4=+3.650$ | $d_4=0.043$ | $n_4=1.616$ | |
| $R_4'=+0.383$ | Cemented | | (H$gl$) |
| $R_5=+0.383$ | $d_5=0.091$ | $n_5=1.744$ | |
| $R_5'=-0.616$ | | | |

(J)(N) Vgl; (H$gl$) bracketed on right

For this example according to the above data table 2a there is refractive power ($\bar{\phi}_{(N)}$) with respect to the light intensity for the negative N which is equal to $-0.7338\Phi$ in correspondence with the second of the relationships of the invention set forth above.

For a clearer illustration in the next following tables there is included a combining of these refractive power values with respect to light intensity as the quotient of the surface refractive power totals of negative N divided by the aperture number ($z$) of the initial opening of the lens series for each of the 12 examples selected for illustration in this application.

TABLE OF $\bar{\phi}_{(N)}$ —VALUES

| | | |
|---|---|---|
| Data table 1) | $-0.8806$ | $f^{-1}$ |
| Data table 2a) | $-0.7338$ | $f^{-1}$ |
| Data table 2b) | $-0.7788$ | $f^{-1}$ |
| Data table 3) | $-0.8738$ | $f^{-1}$ |
| Data table 4) | $-0.9743$ | $f^{-1}$ |
| Data table 5) | $-1.2483$ | $f^{-1}$ |
| Data table 6) | $-1.3163$ | $f^{-1}$ |
| Data table 7) | $-0.9438$ | $f^{-1}$ |
| Data table 8a) | $-1.0342$ | $f^{-1}$ |
| Data table 8b) | $-1.1118$ | $f^{-1}$ |
| Data table 9a) | $-1.2194$ | $f^{-1}$ |
| Data table 9b) | $-1.5831$ | $f^{-1}$ |

Thus, the total crest distance $S=0.480f$ and it is situated in correspondence with the first requirement set forth above between a value of one quarter of and the entire equivalent focal length. The concave front surface has a radius smaller than this focal length and is at $-0.98f$ in the lower range between the absolute limiting values $\frac{2}{3}f$ and $10/3\ f$ according to relationship (3a). The total of $-R_1$ and $R^+$ is between $1.405f$ also in the region of the lower limiting value of the requirements of relationship (3b). The crest distance for the forward component, taken along the optical axis between the crest of the front hollow surface of radius $R_1$ and $R_N'=R_3'$ is $S_{Vvl}=0.276f$, so that it is in accordance with relationship (4a) smaller than the absolute value of $7/12\ R_1$ ($=0.571667f$) and is at the same time greater than the absolute value of $1/12\ R_1$ ($=0.081667f$). Furthermore the difference between the crest length of the forward component ($S_{Vvl}$) and the length of the front radius equals $+0.276f+0.980f=1.256f$ and thus is situated also in the lower part of the range between the absolute limiting values $0.80f$ and $3.80f$ according to the relationship (4b) set forth above.

In the following data table 2b there is in correspondence with the above embodiments a combining of data for a finely corrected form of Example 2 eliminating the letter designations already included in data table 2a for the individual lenses or lens components. The refractive indexes which are provided are also given with respect to the above-referred-to yellow helium light. From a comparison of Tables 2a and 2b it is apparent that between the preliminarily corrected form and the fine corrected example data where for the diaphragm space ($a_{34}$) there is also the pair of diaphragm distances to the adjoining surface crests, only relatively small differences are provided. Also, with this finely corrected form according to data table 2b there are a pair of adjoining surfaces in the rear component (H$gl$) at the side of the shorter conjugate having the same radii of curvature and not provided with an additional air space therebetween but instead cemented to each other at a so-called cemented surface. The radii of curvature of the finely corrected form are rounded out entirely to 6 digits, while for the thickness and air distances along the axis the lengths are given to 4 decimals, or in other words up to one millionth of the equivalent focal length, all of these data being very accurately calculated.

DATA TABLE 2b

[$f=100.000$; $s_\infty'=79.6785$; aperture 1:3.4]

| | | |
|---|---|---|
| $R_1=-97.4696$ | | |
| $R_1'=-99.2599$ | $d_1=4.4756$ | $n_1=1.64250$ |
| $R^+=R_2=+41.3599$ | $a_{12}=0.8951$ | |
| $R_2'=+366.418$ | $d_2=11.8356$ | $n_2=1.75500$ |
| $R_3=-94.9036$ | $a_{23}=5.9178$ | |
| $R_N'=R_3'=+34.6912$ | $d_3=4.0778$ | $n_3=1.67270$ |
| | $a_{34}=6.5643$ | $b_1=4.8435$ Diaphragm space $b_2=1.6908$ |
| $R_4=+423.351$ | $d_4=4.2767$ | $n_4=1.61650$ |
| $R_4'=+36.0140$ | Cemented | |
| $R_5=+36.0140$ | | |
| $R_5'=-60.6699$ | $d_5=0.0508$ | $n_5=1.74400$ |

With the above table, as is the case with all of the remaining data tables, the magnitude $s'_\infty$ signifies the so-called image side portion (shorter conjugate) as the axial distance between the last crest of the last surface and the Gauss image plane for an object which is at infinity.

There is thus a total crest distance $S=47.0937$ percent $f$ according to relationship (1) and the hollow front radius has its length of 97.4696 mm. according to relationship ($3a$) while the absolute value of the sum of the radii of ($R^+$−$R_1$) is at 138.8295 percent $f$, in the region of the lower limit of the relationship ($3b$).

The axial length between the pair of crests of the concave end surfaces is at 27.2019 percent between the absolute limiting values (56.8573 percent on the one hand and 8.1225 percent on the other hand) according to relationship ($4a$) and the absolute value of the sum of the radius of the concave front surface plus the forward component crest distance is at 124.6715 mm. in the lower half of the range of relationship ($4b$).

The next following Example 3 there is also, as was the case in data table $2a$, a further embodiment according to FIG. 3 where also a monochromatic correction in the range of the third power is provided with a paraxial focal length $f_0=1.000$ for the yellow axial ray and where in correspondence with the above description there is provided toward a distant object a concave front lens surface which has a configuration strictly according to a Hoegh zero lens. In order to illustrate the range of use of the new constructive principles of the invention this characteristic concave front lens surface is made of a glass of very low refractive power, having a refractive index substantially smaller than 1.57 and at the same time the radii of this zero lens F is formed so as to be very close to less than double the amount of the equivalent focal length $f$ of the entire objective. Moreover, the axial thickness of the zero lens as contrasted with Example 2 is substantially increased, so that its numerical value at the same time is substantially greater than 1.5 times the thickness, also measured along the optical axis, of the interior dispersing lenses. Thus, this objective is simultaneously provided for an aperture which is substantially greater than that of Example 2, and this aperture can be made without difficulty up to approximately 1:2.9 while retaining an extended viewing field whose diameter is somewhat greater than 87.5 percent of the equivalent focal length corresponding to a primary ray angle inclination of 31° at the diaphragm side. Also with this Example 3 there is for the rear component directed toward the shorter conjugate according to FIG. 3 a doublet whose inner adjoining surfaces have radii of curvature the same length and the same direction sign so that they form a cemented surface.

EXAMPLE 3
[$f=1.000$; $s_\infty'=0.79434$; (aperture approx. 1:2.96)]

| | | |
|---|---|---|
| $R_1=-1.73296$ | $d_1=0.07051$ | $n_1=1.55232$ |
| $R_1'=-1.73296$ | $a_{12}=0.00397$ | |
| $R_+=R_2=+0.42306$ | $d_3=0.12215$ | $n_3=1.75496$ |
| $R_2'=+3.62383$ | $a_{23}=0.05959$ | |
| $R_3=-0.95596$ | $d_3=0.04270$ | $n_3=1.67270$ |
| $R_N'=R_3'=+0.35732$ | $a_{34}=0.06952$ | Diaphragm space |
| $R_4=+3.62383$ | $d_4=0.04469$ | $n_4=1.61658$ |
| $R_4'=+0.38016$ | Cemented | |
| $R_5=+0.38016$ | $d_5=0.08839$ | $n_5=1.74420$ |
| $R_5'=-0.61175$ | | |

The above refractive indexes again are with respect to the yellow line of helium light of $\lambda=5,876$ A. and all radii axial thicknesses and air distances are given up to 5 decimal places.

Also with this objective the signs (absolutely calculated) are less than 1.25 percent for the image field edge region.

The example of FIG. 3 corrected to the range of the third power, in other words preliminarily corrected within the Seidal range, differs in an insubstantial manner from a finely corrected form.

For didactic reasons the residual aberration of the basic form is determined according to exact trigonometric calculations, where for the zonal ray there is a maximum spherical aberration ($h_1=11.9379$ percent $f$ corresponding to a relative aperture of 1:4.188) having a longitudinal spherical zonal error smaller than −0.363 percent $f$, while for an entrance pupil diameter of 0.33765 $f$ (accurately edge ray entrance height of $h_{1RD}=16.88273$ percent $f$ corresponding to exact aperture of 1:2.9616) the spherical edge ray aberration is smaller than +0.082 percent $f$.

At the same time the astigmatic adjusted difference between the sagital and tangential image point for the primary ray at the edge of the image field is (in correspondence with the total viewing field diameter of 87.589 percent $f$) only −0.0925 percent $f$, while the maximum zonal error for astigmatic adjusted differences for a viewing field diameter of 66.9434 percent $f$ only has an amount +0.3329 percent $f$, where the positive sign signifies that the tangential astigmatic image point in the light direction is situated at the right of the sagital image point.

For the above largest lateral ray inclination there is the sign of this example −1.22 percent, while for this lateral zonal ray there is a value of −0.58 percent.

For exact calculation of these lateral rays the front diaphragm distance in the air space $a_{34}$ is $b_1=0.04767 f$ and the diaphragm distance to the front crest of the rear component is $b_2=0.02185 f$.

The entire crest distance (relationship 1) is 50.122 percent $f$, the hollow front surface has a radius according to relationship ($3a$) has a length of approximately 175 percent $f$, while the radii total according to relationship ($3b$) is −215.602 percent $f$. The crest distance $S_{Wl}$ between the pair of dispersing outer surfaces having the radii $R_1$ on the one hand and $R_N'=R_3'$ on the other hand is at 29.892 percent $f$ in the lower half of the absolute range of 14.441 percent $f$ and 101.089 percent $f$ according to relationship ($4a$), while the total, according to relationship ($4b$) has an absolute value of 203.188 percent $f$ in the vicinity of the absolute center of the range.

In the following Example 4 there is an even greater aperture and at the same time a chromatically corrected objective according to the invention where the relative aperture according to the following table is 1:2.70. The hollow lens directed toward the longer conjugate is made of a low-refracting glass and has the form of a positive meniscus, as already set forth above. The rear component $Hgl$ directed toward a shorter conjugate is again in accordance with FIG. 3 in the form of a cemented doublet.

The large aperture of this example accompanied by a highly noteworthy advance in the reduction of image errors of the higher orders is particularly apparent at the lower zonal errors in particular in the lateral image field portions, as is apparent from the graphic illustration of the curves designated FIG. 3/4, from which these factors are readily apparent.

This objective is characterized not only by an extremely small residual designation but also by an extremely good elimination of the comatic residual aberration. With this example there is also a dispersing lens following the diaphragm and made of a low-refractive glass whose yellow refractive index is smaller than 1.56, as is apparent from the following data table which at the same time shows that the refractive indexes of the converging lenses are maintained essentially lower than with the above embodiments of smaller apertures as exemplified in the new type of objective shown in FIG. 3.

EXAMPLE 4
[$f=100.0$; $s_\infty'=78.417$; aperture 1:2.7]

| | | | |
|---|---|---|---|
| $R_1=-120.7363$ | $d_1=6.05250$ | $n_1=1.54950$ | $v_1=45.4$ |
| $R_1'=-117.5904$ | $a_{12}=1.00097$ | | |
| $R_+=R_2=+38.0846$ | $d_2=11.4^-968$ | $n_2=1.71^-00$ | $v_2=53.8$ |
| $R_2'=+302.9132$ | $a_{23}=6.62548$ | | |
| $R_3=-89.6108$ | $d_3=2.24027$ | $n_3=1.64611$ | $v_3=34.0$ |
| $R_N'=R_3'=+32.8^-28$ | $b_2=5.31852$ | | Diaphragm |
| $R_4=+129.299$ | $a_{34}=7.38813$ | | |
| | $b_2=2.04961$ | | |
| $R_4'=+44.4050$ | $d_4=3.49864$ | $n_4=1.54950$ | $v_4=45.4$ |
| $R_5=+44.4050$ | Cemented | | |
| $R_5'=-60.0211$ | $d_5=8.18795$ | $n_5=1.72016$ | $v_5=54.8$ |

Thus, it will be seen that S=46.43462 percent $f$ to fulfill relationship (1) and $-R_1$=120.7363 percent $f$ to fulfill relationship (3a) while the sum of the radii according to the relationship (3b) is −82.65168 percent $f$. To fulfill the relationship (4a) $-S_{Vp1}$ is very nearly equal to 2.7/12 $R_1$ and the value $S_{Vp1}$−R is at 148.0962 percent $f$ in the lower part of the range according to relationship (4b) of the entire combination of the relationships of the invention.

Figure 4:
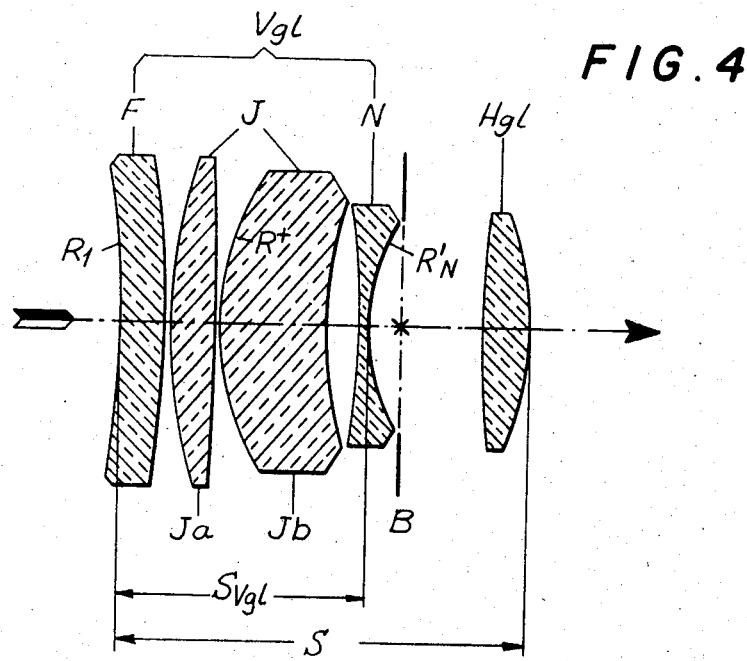

In correspondence with FIG. 4, the next following two examples are concerned with five-lens forms of the objective of the invention. These are built, however, from five individual lenses situated in air and for a somewhat smaller viewing field (image field diameter equal to 0.5$f$) with an even greater aperture (approximately 1:2) than the above three examples. From these examples the first (Example 5) has a monochromatic correction for the Seidel range to the third power which forms a front lens directed toward a distant object and having a front concave surface as a positive meniscus and from the same glass as the last converging lens directed toward the range. The converging interior lens part J is made of a pair of individual lenses which have a small airgap ($a_{23}$) between themselves.

EXAMPLE 5
[$f$=1; $s\infty'$=0.6]

| | | | | |
|---|---|---|---|---|
| $R_1$=−3.18 | $d_1$=0.082 | $n_1$=1.620 | (L) | |
| $R_1'$=−2.87 | $a_{12}$=0.005 | Air | | |
| $R_2$=+0.87 | $d_2$=0.082 | $n_2$=1.615 | | |
| $R_2'$=−5.25 | $a_{23}$=0.005 | Air | (J) | Vgl |
| $R^+$=$R_3$=+0.47 | $d_3$=0.200 | $n_3$=1.615 | | |
| $R_3'$=+0.73 | $a_{34}$=0.047 | Air | | |
| $R_4$=−1.42 | $d_4$=0.021 | $n_4$=1.717 | (N) | |
| $R_N'$=$R_4'$=+0.36 | $a_{45}$=0.200 | Diaphragm space | | |
| $R_5$=−1.45 | $d_5$=0.082 | $n_5$=1.620 | (Hgl) | |
| $R_5'$=−0.50 | | | | |

Thus, it will be seen that S=0.724 in accordance with relationship (1), and $R_1$ is equal to −3.18 $f$, which is to say it is situated at 9.54 thirds of the equivalent focal length $f$, according to relationship (3a). The radial length according to relationship (3b) is 3.65 $f$ and thus is situated at the upper limit of the range of this feature. The crest distance of the forward component ($S_{Vp1}$) is 0.442 $f$ and thus is situated between 0.266 and 1.855, according to relationship (4a), while the value in accordance with relationship (4b) is 3.622 $f$, at the upper limit of the permissible range for requirement (4b).

In the next following Example 6 there is a finely corrected embodiment of the objective of the invention according to that illustrated in FIG. 4 where in contrast to Example 5 which was preliminarily corrected in the Seidel range all of the positive lenses are made of the same type of glass. Also, with this particular objective the positive radius of sharpest curvature or smallest magnitude in the direction of light travel is provided at the second of the two lenses which form the inner lens pair J. The focal length is 100 mm. and the aperture is somewhat higher than 1:2, as is apparent from the following data table. The radii of curvature are given out to 4 decimals rounded off according to coma while the axial lens thickness and airgaps are given up to b 5 decimal places according to coma.

Figure 9:
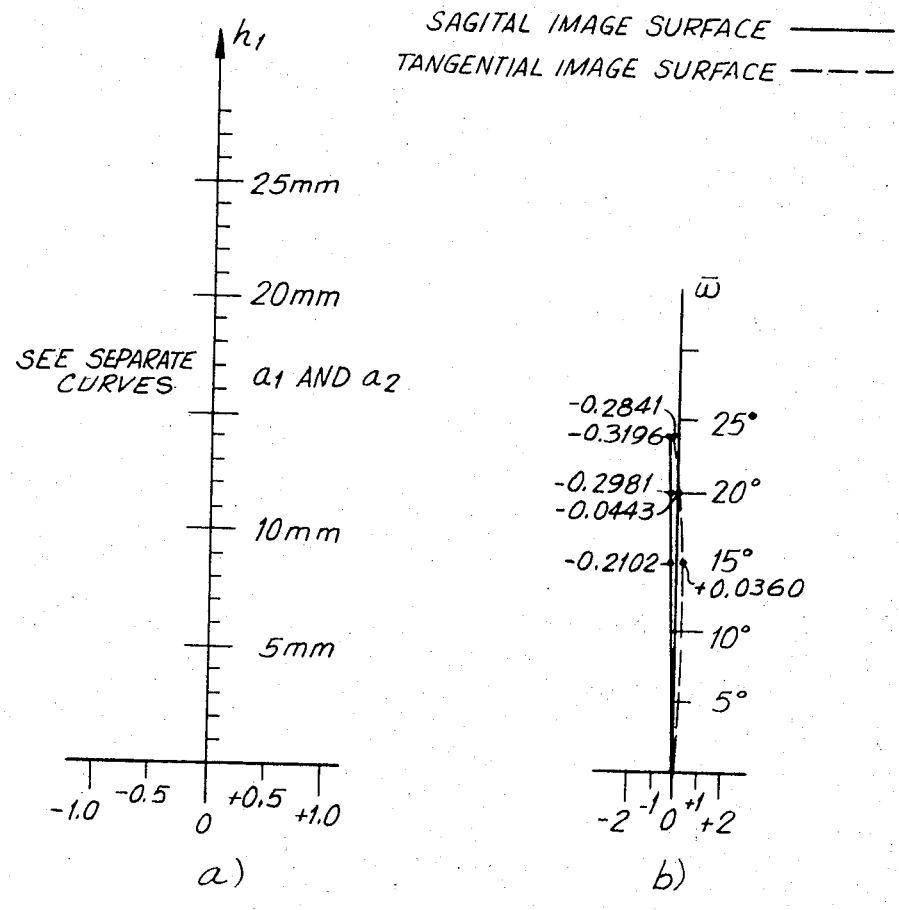
Figure 9:
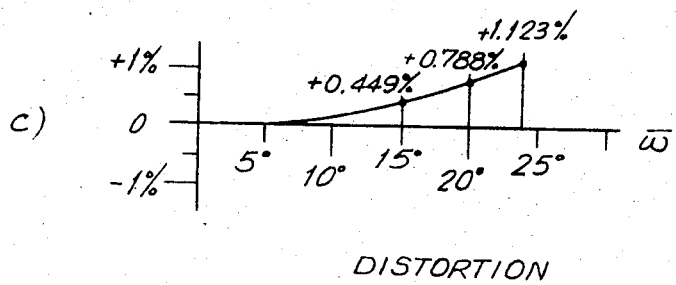

The corresponding aberration curves are provided on the sheet designated FIGS. 9–11, and these curves are the result of exact calculations where, differently from the original type of illustration according to M. V. Rohr for the chromatic correction (6$a_1$) and for the spherochromatic corrections (6$a_2$) separate illustrations at an enlarged scale are provided so that the small residual aberrations can be clearly illustrated. The dispersion values which are the basis for these curves are to be taken from the following data where in the first column the spectral regions are given while in the second column the dispersion values for the glass type of the four positive lenses, and the third column gives the corresponding values of the glass of the dispersing lenses:

| | | | |
|---|---|---|---|
| C-A' | : | 0.00360 | 0.00752 |
| d-C | : | 0.00303 | 0.00683 |
| e-d | : | 0.00256 | 0.00596 |
| F-e | : | 0.00470 | 0.01152 |
| g-F | : | 0.00557 | 0.01453 |

AXIAL CHROMATIC ABERRATIONS

| Spectral Line | $\delta s_x'$ | $\delta f_\infty'$ |
|---|---|---|
| C | +0.09 868 | +0.07 695 |
| d | 0 | 0 |
| e | −0.06 165 | −0.04 452 |
| F | −0.10 288 | +0.05 560 |
| g | −0.04 474 | +0.03 203 |

Spherochromatic deviations ($\delta s_x'$).

| Spectral Line | Receiving height of parallel rays | | ($h_1$) |
|---|---|---|---|
| | 0.00 (axis) | 18.38 (Zone) | 25.94 (edge) |
| A' | +0.29 470 | 0.08 489 | −0.00 086 |
| C | +0.09 868 | −0.23 267 | −0.09 597 |
| d | 0 | −0.28 130 | −0.08 230 |
| e | −0.06 165 | −0.29 943 | −0.10 072 |
| F | −0.10 288 | −0.25 051 | +0.11 349 |

The concave front lens F directed toward the longer conjugate is in the embodiment given the form of a positive meniscus which is curved more sharply than the corresponding lens of Example 5, as may be seen from a comparison of the data tables. The finely corrected viewing field is determined for a diameter of 51 percent of the focal length, corresponding to an aperture-side primary ray inclination angle of 24° as also may be seen from the sheets of curves designated FIGS. 9–11.

EXAMPLE 6
[$f$=100.000; $s\infty'$=60.1944; aperture 1:1.95]

| | | | |
|---|---|---|---|
| $R_1$=−179.3726 | $d_1$=8.24519 | $n_1$=1.6203 | $v_1$=60.3 |
| $R_1'$=−166.1365 | $a_{12}$=0.21142 | | |
| $R_2$=+91.6120 | $d_2$=8.13949 | $n_2$=1.6203 | $v_2$=60.3 |
| $R_2'$=−403.0888 | $a_{23}$=0.52854 | | |
| $R^+$=$R_3$=+44.9445 | $d_3$=20.08444 | $n_3$=1.6203 | $v_3$=60.3 |
| $R_3'$=+66.0858 | $a_{34}$=4.75684 | | |
| $R_4$=−147.2373 | $d_4$=2.11415 | $n_4$=1.7180 | $v_4$=29.5 |
| $R_N'$=$R_4'$=+34.5325 | $b_1$=4.22830 | | Diaphragm |
| | $a_{45}$=20.08444 | | |
| | $b_2$=15.85614 | | |
| $R_5$=+157.5050 | $d_5$=8.45661 | $n_5$=1.6203 | $v_5$=60.3 |
| $R_5'$=−48.4202 | | | |

Thus, S=72.62112, so that it is situated in the upper half of relationship (1) and the concave front radius is −179.3726 also in the upper half of relationship (3a). The sum of the radii according to relationship (3b) is −224.3171 mm., while the crest distance between the pair of dispersing outer end surfaces of the forward component is $S_{Vp1}$=44.08007 percent $f$, in the lower half of the range (absolutely calculated) of 0.149477 on the one hand and 1.046340 on the other hand according to relationship (4a), while the sum according to relationship (4b) is −223.45267 percent $f$.

Figure 5:
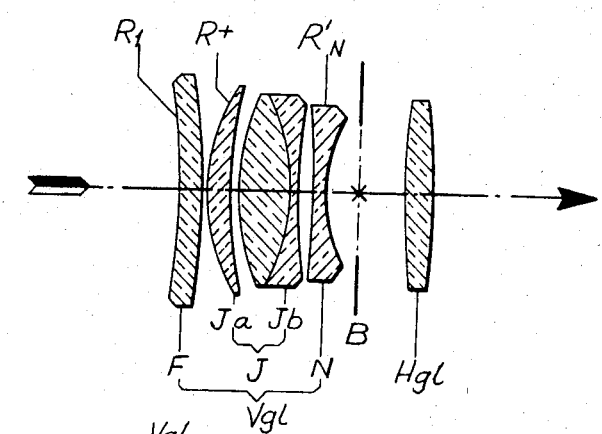
Figure 6A:
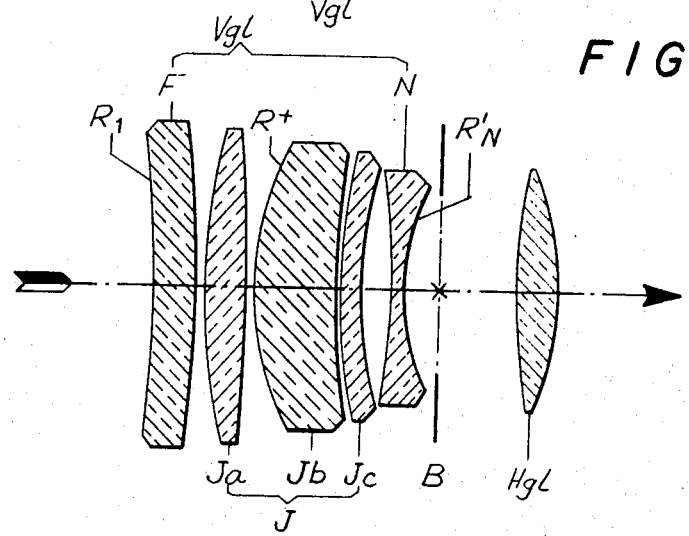
Figure 6B:
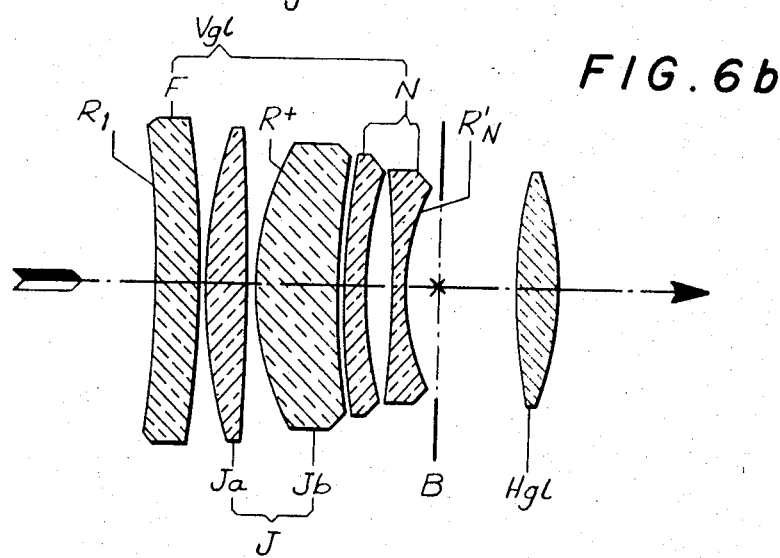

In FIG. 5 there is a six-lens triplet expansion including five elements situated in air according to the invention where the positive radius of sharpest curvature or smallest magnitude $R^+$ is situated at the first of the pair of elements situated in air and forming the inner component J. The element of the inner lens assembly J which is situated at the second location is made up of a cemented doublet. Objectives according to FIG. 5 are provided for the special purpose of microprojection, so that in the following Examples 7 and 8 the same elements are used to build the structures of these examples, for didactic reasons, with the distinction, however, that in FIG. 7 the hollow front lens directed toward the longer conjugate has the form of a negative meniscus while in example 8 this hollow front lens F has the form of a positive meniscus. Both examples are monochromatic for the yellow $d$ line of the helium spectrum and thus are designed for imaging in a wave length region of 550–600 milimicrons.

The next following Example 7 is corrected in the region of the third power and with relative aperture of approximately $f{:}3.5$ for only a small image angle (total angular field of approximately 12.5°), with the distance from the exterior positive surface of radius $R_6'$, directed toward the shorter conjugate, up to the concave front surface of radius $R_1$ is at a value of 0.41462, according to relationship (1). The front radius $R_1$ is $-1.607f$ according to relationship (2) and the sum of the radii according to relationship (3a) is $-191.80$ percent $f$. The crest distance of the forward component is $S_{Vvl}=23.204$ percent $f$ between the values of $-0.1339f$ and $-0.9374f$ according to relationship (4a) while the sum according to relationship (4b) is $-183.904$ percent $f$.

EXAMPLE 7
[f=1; s∞=0.65]

| | | | |
|---|---|---|---|
| $R_1=-1.607$ | $d_1=0.04565$ | $n_1=1.5523$ | (F) |
| $R_1'=-1.740$ | $a_{12}=0.00190$ | | |
| $R^+=R_2=+0.311$ | $d_2=0.04850$ | $n_2=1.5895$ | |
| $R_2'=+0.918$ | $a_{23}=0.00095$ | | |
| $R_3=+0.366$ | $d_3=0.09034$ | $n_3=1.6131$ | (J) Vgl |
| $R_3'=-0.366$ Cemented | | | |
| $R_4=-0.366$ | $d_4=0.00951$ | $n_4=1.5895$ | |
| $R_4'=+1.220$ | $a_{45}=0.01712$ | | |
| $R_5=-2.174$ | $d_5=0.01807$ | $n_5=1.6490$ | (N) |
| $R_N'=R_5'=+0.216$ | $a_{56}=0.13408$ | | Diaphragm space |
| $R_6=+0.935$ | $d_6=0.04850$ | $n_6=1.6385$ | (Hgl) |
| $R_6'=-1.298$ | | | |

The next following Example 8, according to FIG. 5, is monochromatically corrected for the yellow spectral region,

DATA TABLE 8a
[f=1; s∞′=0.64]

| | | | |
|---|---|---|---|
| $R_1=-1.85$ | $d_1=0.0485$ | $n_1=1.5523$ | |
| $R_1'=1.71$ | $a_{12}=0.0020$ | | |
| $R^+=R_2=+0.33$ | $d_2=0.0515$ | $n_2=1.5895$ | |
| $R_2'=+0.97$ | $a_{23}=0.0010$ | | |
| $R_3=+0.39$ | $d_3=0.0959$ | $n_3=1.6131$ | (Vgl) |
| $R_3'=-0.39$ Cemented | | | |
| $R_4=-0.39$ | $d_4=0.0101$ | $n_4=1.5895$ | |
| $R_4'=+1.20$ | $a_{45}=0.0182$ | | |
| $R_5=-2.31$ | $d_5=0.0192$ | $n_5=1.6490$ | |
| $R_N'=R_5'=+0.23$ | $a_{56}=0.1424$ | | Diaphragm space |
| $R_6=+0.99$ | $d_6=0.0515$ | $n_6=1.6203$ | (Hgl) |
| $R_6'=-1.25$ | | | | while the hollow front lens has the configuration of a positive meniscus.

Thus, Example 8a is corrected for the region of the third power and is provided for a relative aperture of approximately 1:3, while again the second positive lens of the inner assembly J has the form of a cemented doublet.

The embodiment according to the following data table 8b, finely corrected monochromatically for the yellow light is at its aperture of 1:2.8 a still more powerful microprojection objective where the objects to be projected are situated at the hollow shell arranged in the region of the focal point at the side of the shorter conjugate, this hollow shell having a radius of $-5.5f$ and a total diameter of $0.4f$.

DATA TABLE 8b
[f=100.0; s∞′=63.59; aperture 1:2.8]

| | | | |
|---|---|---|---|
| $R_1=-184.7636$ | $d_1=4.84626$ | $n_1=1.5523$ | |
| $R_1'=-170.6287$ | $a_{12}=0.20193$ | | |
| $R^+=R_2=+33.0151$ | $d_2=5.14915$ | $n_2=1.5895$ | |
| $R_2'=+97.4300$ | $a_{23}=0.10096$ | | |
| $R_3=+38.8710$ | $d_3=9.59155$ | $n_3=1.6131$ | (Vgl) |
| $R_3'=-38.8710$ Cemented | | | |
| $R_4=-38.8710$ | $d_4=1.00964$ | $n_4=1.5895$ | |
| $R_4'=+129.5364$ | $a_{45}=1.81735$ | | |
| $R_5=-230.8030$ | $d_5=1.91831$ | $n_5=1.6490$ | |
| $R_N'=R_5'=+22.9188$ | | | |
| | $b_1=4.23588$ | | |
| | $a_{56}=14.23588$ | | |
| | $b_2=10.00000$ | | Diaphragm |
| $R_6=+99.2473$ | $d_6=5.14915$ | $n_6=1.6203$ | (Hgl) |
| $R_6'=-125.1950$ | | | |

In the next following Example 9 there is a six-lens objective composed of six elements situated in air, where the aperture is approximately $f{:}2$ and where the positive inner lens assembly J is made up of three lenses in such a way that in the direction toward the shorter conjugate there are a pair of positive lenses of which the second has the positive radius $R^+$ of sharpest curvature or in other words of smallest magnitude, while the third lens is a negative lens which has its most sharply curved dispersing exterior surface directed toward the next following negative N. This example also is provided for use in the yellow spectral region and is thus provided with a monochromatic correction. The objective of Data Table 9a is corrected in the Seidel range to the third power and has a hollow front lens F the exterior configuration of which is that of a positive meniscus, whose glass refractive index is greater than 1.68. Between the next-to-last and last lenses there is an enclosed airgap ($a_{34}$) in the form of a parallel airgap the limiting surfaces of which, of radii $R_3'$ and $R_4$, are provided for the sake of simplicity with the radial length of the hollow front surface namely $R_1$.

In the Data Table 9b, the hollow front lens directed toward the longer conjugate is finely corrected monochromatically for the $d$-line of the helium spectrum of 5,876 A. wavelength, and it has the configuration of a negative meniscus where the surface of radius $R_1$ has a radius of curvature shorter than the radius $R_1'$ of the next following surface. This objective has in correspondence with the data table an aperture of 1:1.94. With this construction, in contrast with the preliminary corrected form, there is not only an air space between the fourth and fifth individual lenses ($a_{45}$) but also there is already present the forward air space ($a_{34}$) with the configuration of a dispersing air lens, since the converging radius ($R_4$) is made about 30 percent longer than the forward dispersing radius $R_3'$ of the second converging lens of the inner lens assembly J. For these reasons the construction does not prevent the dispersing negative lens limited by the pair of air spaces ($a_{34}$ and $a_{56}$) as being in common in the form of a two-part negative N which encloses within itself a strongly dispersive air lens ($a_{45}$). The useful viewing field of this objective is 53.8 percent of the equivalent focal length $f$, corresponding to an aperture-side primary ray inclination angle $\bar{\omega}=25.0°$, within which all astigmatic image points deviate from the Gauss image plane by less than 0.375 percent $f$ and where the maximum astigmatic adjusting difference between the sagital and tangential image points is held in the entire lateral image field at less than ¼ percent $f$ while at the same time the maximum designation for the edge image point remains smaller than +0.62 percent.

EXAMPLE 9 (FIG. 6).—DATA TABLE 9a
[$f=1$; $s_\infty'=0.618$]

| | | | | |
|---|---|---|---|---|
| $R_1=-2.2038$ | | | | |
| $R_1'=-2.0056$ | $d_1=0.08385$ | $n_1=1.713$ | (F) | |
| $R_2=+0.9181$ | $a_{12}=0.00215$ | | | |
| $R_2'=-5.3752$ | $d_2=0.08278$ | $n_2=1.620$ | | |
| $R^+=R_3=+0.4784$ | $a_{23}=0.00537$ | | | |
| $R_3'=+2.2038$ | $d_3=0.16127$ | $n_3=1.613$ | (J) | Vgl |
| $R_4=+2.2038$ | $a_{34}=0.00126$ | | | |
| $R_4'=+0.7525$ | $d_4=0.04097$ | $n_4=1.615$ | | |
| $R_5=-1.4513$ | $a_{45}=0.04838$ | | | |
| $R_N'=R_5'=+0.3687$ | $d_5=0.02150$ | $n_5=1.717$ | (N) | |
| | $a_{56}=0.20426$ | | Diaphragm space | |
| $R_6=+1.6319$ | $d_6=0.06988$ | $n_6=1.658$ | (Hgl) | |
| $R_6'=-0.5288$ | | | | |

In the latter embodiments of the invention the optical builder has available such a large diaphragm space that it can be provided with a beam-splitting system beside or instead of a diaphragm. Such a beam splitter can be used for changing the direction of the light or for partially deflecting the light rays which pass through the objective.

Such a beam splitter can have in a known manner either flat surfaces through which the light passes or outer surfaces which are more or less slightly curved, but which nevertheless in accordance with the present invention are provided with dimensions and other characteristics for fulfilling the objects of the present invention, because such additional elements and their surfaces are not to be considered as optical components of the forward component V$gl$ having exterior end surfaces of biconcave configuration.

DATA TABLE 9b
[$f=100.000$; $s_\infty'=61.802$; Aperture 1:1.94]

| | | | | |
|---|---|---|---|---|
| $R_1=-201.4678$ | | | | |
| $R_1'=-202.5878$ | $d_1=8.37603$ | $n_1=1.7130$ | (F) | |
| $R_2=+86.76476$ | $a_{12}=0.21446$ | | | |
| $R_2'=-426.1629$ | $d_2=8.26930$ | $n_2=1.6203$ | | |
| $R^+=R_3=+17.14308$ | $a_{23}=0.53665$ | | (J) | Vgl |
| $R_3'=+201.0263$ | $d_3=16.10967$ | $n_3=1.6130$ | | |
| $R_4=+262.4753$ | $a_{34}=0.12586$ | | | |
| $R_4'=+71.24985$ | $d_4=4.09286$ | $n_4=1.6150$ | | |
| $R_5=-159.4964$ | $a_{45}=4.83290$ | | (N) | |
| $R_N'=R_5'=+36.00203$ | $d_5=2.14762$ | $n_5=1.71740$ | | |
| | | $b_1=4.29524$ | | |
| | $a_{56}=20.40391$ | | Diaphragm | |
| $R_6=+146.6633$ | | $b_2=16.10867$ | | |
| $R_6'=-53.57354$ | $d_6=6.98052$ | $n_6=1.6585$ | (Hgl) | |

Also included within the present invention are those modifications where at the side of the shorter conjugate there are still additional optical lenses. The same applies when there are located somewhat in front of the dispersing concave front lens F at the side of the longer conjugate additional elements (such as beam splitter system as referred to above or a color filter), since in this case also such situation in front of the objective of the invention of additional elements does not really have any particular influence on the results of the invention or on the advance which is achieved with the objective of the invention inasmuch as such preliminary components either do not have any direct effect on the structure of the invention or they completely eliminate the effects achieved by the structure of the invention.

Finally, the following tables have numerical values, correspondingly shortened, which show the manner in which the 11 numerical examples satisfy the relationships of the invention referred to above. The only examples which are not included in these tables are the corresponding numerical values for relationship (2) since this particular value is clearly apparent from the above tables of specific practical examples of the present invention.

| Example | Data table | (1) $0.25f<S<1.00f$ | (3a) $\frac{2}{3}f<-R_1<\frac{40}{3}f$ | (3b) $0.9f<|R_1+R^+|<3.8f$ | (4a) $\begin{cases}\frac{7}{12}|R_1|\\\frac{1}{12}|R_1|\end{cases}$ | $S_{Vgl}$ |
|---|---|---|---|---|---|---|
| 1 | 1 | 0.276 f | 0.69 f | 0.92 f | 0.4025 f / 0.0575 f | 0.146f |
| 2 | 2a | 0.480 f | 0.980 f | 1.405 f | 0.57166...f / 0.08166...f | 0.276f |
| | 2b | 0.4709..f | 0.9746...f | 1.3882...f | 0.56857...f / 0.08122...f | 0.2720...f |
| 3 | 3 | 0.5015.f | 1.7329...f | 2.1560.f | 1.01089...f / 0.14441...f | 0.2989.f |
| 4 | 4 | 0.4643..f | 1.2073...f | 1.5882...f | 0.70429...f / 0.10061...f | 0.2735..f |
| 5 | 5 | 0.724 f | 3.18 f | 3.65 f | 1.855...f / 0.265...f | 0.442 f |
| 6 | 6 | 0.7262..f | 1.7937..f | 2.2431..f | 1.04634...f / 0.14947...f | 0.4408...f |
| 7 | 7 | 0.4146.f | 1.607 f | 1.918 f | 0.93741...f / 0.13391...f | 0.2320.f |
| 8 | 8a | 0.4403 f | 1.85 f | 2.18 f | 1.07916...f / 0.15416...f | 0.2464 f |
| | 8b | 0.4402..f | 1.8476..f | 2.1777..f | 1.07778...f / 0.15396...f | 0.2463...f |
| 9 | 9a | 0.7216.f | 2.2038 f | 1.7254 f | 1.28555...f / 0.18365...f | 0.4475.f |
| | 9b | 0.7208...f | 2.0146..f | 1.5432..f | 1.17522...f / 0.16788...f | 0.4470..f |

| Example | Data table | (4b) $0.8f<(Svgl/-R_1)<3.8f$ | (5a) $0.4f<\|Rv'+R_1\|<2.9f$ | (5b) $fvgl$ |
|---|---|---|---|---|
| 1 | 1 | 0.836 f | 0.46 f | −0.50 |
| 2 | 2a | 1.256 f | 0.620 . f | −0.462 .. |
|   | 2b | 1.246 .. f | 0.6277 .. f | −0.475 .. |
| 3 | 3 | 2.0318 .. f | 1.3756 . f | −0.658 .. |
| 4 | 4 | 1.4809 . f | 0.8690 . f | −0.630 .. |
| 5 | 5 | 3.622 f | 2.82 f | −0.796 .. |
| 6 | 6 | 2.2345 . f | 1.4484 . f | −0.677 .. |
| 7 | 7 | 1.8390 . f | 1.3910 f | −0.763 .. |
| 8 | 8a | 2.096 .. f | 1.620 f | −0.778 .. |
|   | 8b | 2.0939 . f | 1.6184 . f | −0.779 .. |
| 9 | 9a | 2.651 .. f | 2.572 .. f | −0.713 .. |
|   | 9b | 2.461 .. f | 2.374 .. f | −0.696 .. |

What is claimed is:

1. In a relatively powerful objective of relatively wide aperture, at least four elements of the expanded triplet type situated in air and including an inner negative element situated at the region of the diaphragm, said negative element being followed in the direction of the shorter conjugate by a positive rear component while there is forwardly of the rear component directed toward a distant object a forward component which includes said negative element and which includes at its front end a magnifying lens, limited in such a way that the front lens has a central axial thickness of such a small size with respect to the length of the radius of its forwardly directed surface that the absolute value of the quotient of said axial thickness divided by the radius of the front surface is smaller than 1/7 without, however, being smaller than 1/70, said front element of said forward component having directed toward the plane of a distant object a hollow, concave, overcorrecting front surface having at the optical axis a crest providing for the entire objective an axial length along the optical axis from said crest of said front surface to a crest of the rear surface of said rear component which is between a minimum of 0.25 the equivalent focal length of the entire objective and a maximum equal to the focal length of the entire objective, while the inner negative element has with respect to an aperture number an individual refractive power the absolute value of which is between ⅔ and 5/3 times the entire refractive power of the objective, and the front radius of said front surface of said front element having a length greater than ⅔ the equivalent focal length of the entire objective without exceeding a value of 10/3 the latter equivalent focal length, said forward component including in addition to said front lens at least a positive lens forming an inner element in the direction from said front lens toward the negative element which is situated in air, said inner positive lens element of said forward component also having the surface of smallest converging radius in the positive direction of all of the air-engaging lens surfaces of said forward component, said latter radius having a length which when added to the radius of the front surface of the front lens, calculated absolutely, is between 0.9 and 3.8 of the equivalent focal length of the entire objective, the front surface of the front lens and the rear surface of the rear lens of said forward component, providing the forward component with a biconcave configuration in its entirety, with said forward component being formed by said front lens, said inner positive lens, and said inner negative element and the distance along the optical axis from the crest of the front surface of the front lens to the crest of the rear surface of the rear lens of said forward component being smaller than 7/12 of the absolutely calculated length of the radius of curvature of the concave hollow front surface of the front lens which is directed toward the object while being greater than 1/12 of the latter, and while at the same time the magnitude of the front radius of the front lens and said distance along the optical axis from the crest of the front surface of the front lens to the crest of the rear surface of the rear lens of the forward component being greater than 0.8 times but at a maximum 3.8 times the equivalent focal length of the entire objective, and wherein the negative value of the sum of the radii of curvature of both dispersive exterior surfaces at the ends of the forward component being greater than 0.4 but less than 2.9 times the equivalent focal length of the entire objective, and the combination of elements which form said forward component having a Gardner's shape index the absolute value of which is between 0.45 and 0.90.

2. In an objective as recited in claim 1, the following rounded-off data for a unit focal length, where the glass properties are characterized by the average refractive index $(n_d)$ and by the Abbe number for the color dispersion, while the relative aperture is $f:3.9$:

| Radii | Crest distance | Glass properties | |
|---|---|---|---|
| $(R_1)=-0.69 f$ | $(d_1)=0.037 f$ | 1.52/57 | (F) |
| $(R_1')=-0.71 f$ | $(a_{12})=0.013$ | Air | |
| $(R_2)(R+)=+0.23 f$ | $(d_2)=0.046 f$ | 1.62/57 | (J) |
| $(R_2')$=plano | $(a_{23})=0.037$ | Air | |
| $(R_3)=-0.78 f$ | $(d_3)=0.013 f$ | 1.61/37 | (N) |
| $(R_3')(R_N')=+0.23 f$ | $(a_{34})=0.100 f$ | Air | |
| $(R_4)=+1.99 f$ | $(d_4)=0.030 f$ | 1.65/51 | (Hgl) |
| $(R_4')=-0.65 f$ | | | |

3. In an objective as recited in claim 1, the following rounded-off data for a unit focal length $f$, where the glass is indicated according to its average refractive index $(n_d)$ and the relative aperture is $f:3.4$:

| Radii | Crest distance | Glass properties | |
|---|---|---|---|
| $(R_1)=-0.97 f$ | $(d_1)=0.045 f$ | 1.642 | (F) |
| $(R_1')=-0.99 f$ | $(a_{12})=0.090 f$ | Air | |
| $(R_2)(R+)=+0.41 f$ | $(d_2)=0.118 f$ | 1.755 | (J) |
| $(R_2')=+3.66 f$ | $(a_{23})=0.059 f$ | Air | |
| $(R_3)=-0.95 f$ | $(d_3)=0.041 f$ | 1.673 | (N) |
| $(R_3')(R_N')=+0.35 f$ | $(a_{34})=0.066 f$ | Air | |
| $(R_4)=+4.23 f$ | $(d_{4a})=0.043 f$ | 1.616 | (Hgl) |
| $(R_4')=+0.36 f$ | 0 | | |
| $(R_5)=+0.36 f$ | $(d_{4b})=0.091 f$ | 1.744 | |
| $(R_5')=-0.61 f$ | | | |

4. In an objective as recited in claim 1, the following rounded-off data for a unit focal length $f$, where the glass is indicated according to its average refractive index ($n_d$) and the relative aperture is $f:2.96$:

| Radii | Crest distance | Glass properties |
|---|---|---|
| $(R_1) = -1.73 f$ | $(d_1) = 0.071 f$ | 1.552 (F) |
| $(R_1') = -1.73 f$ | $(a_{12}) = 0.004 f$ | Air |
| $(R_2)(R+) = +0.42 f$ | $(d_2) = 0.122 f$ | 1.755 (J) |
| $(R_2') = +3.62 f$ | $(a_{23}) = 0.060 f$ | Air |
| $(R_3) = -0.96 f$ | $(d_3) = 0.043 f$ | 1.673 (N) |
| $(R_3')(R_N') = +0.36 f$ | $(a_{34}) = 0.070 f$ | Air |
| $(R_4) = +3.62 f$ | $(d_{4a}) = 0.045 f$ | 1.617 |
| $(R_4') = +0.38 f$ | 0 | (Hgl) |
| $(R_5) = +0.38 f$ | $(d_{4b}) = 0.088 f$ | 1.744 |
| $(R_5') = -0.61 f$ | | |

5. In an objective as recited in claim 1, the following rounded-off data for a unit focal length $f$, where the glass properties are characterized by the average refractive index ($n_d$) and the Abbe number ($v$) for the color dispersion, while the relative aperture is $f:2.7$:

| Radii | Crest distance | Glass properties |
|---|---|---|
| $(R_1) = -1.207 f$ | $(d_1) = 0.0605 f$ | 1.5495/45.4 (F) |
| $(R_1') = -1.176 f$ | $(a_{12}) = 0.0100 f$ | Air |
| $(R_2)(R+) = +0.381 f$ | $(d_2) = 0.1144 f$ | 1.7130/53.8 (J) |
| $(R_2') = +3.029 f$ | $(a_{23}) = 0.0625 f$ | Air |
| $(R_3) = -0.896 f$ | $(d_3) = 0.0224 f$ | 1.6461/34.0 (N) |
| $(R_3')(R_N') = +0.338 f$ | $(a_{34}) = 0.0739 f$ | Air |
| $(R_4) = +12.39 f$ | $(d_{4a}) = 0.0350 f$ | 1.5495/45.4 |
| $(R_4') = +0.444 f$ | 0 | (Hgl) |
| $(R_5) = +0.444 f$ | $(d_{4b}) = 0.0819 f$ | 1.7292/54.8 |
| $R_5' = -0.608 f$ | | |

6. In an objective as recited in claim 1, the following rounded-off data for a unit focal length $f$, where the glass is indicated according to its average refractive index ($n_d$) and the relative aperture is $f:2.0$:

| Radii | Crest distance | Glass properties |
|---|---|---|
| $(R_1) = -3.18 f$ | $(d_1) = 0.082 f$ | 1.620 (F) |
| $(R_1') = -2.87 f$ | $(a_{12}) = 0.005 f$ | Air |
| $(R_2) = +0.87 f$ | $(d_2) = 0.082 f$ | 1.615 |
| $(R_2') = -5.25 f$ | $(a_{23}) = 0.005 f$ | Air (J) |
| $(R_3)(R+) = +0.47 f$ | $(d_3) = 0.200 f$ | 1.615 |
| $(R_3') = +0.73 f$ | $(a_{34}) = 0.047 f$ | Air |
| $(R_4) = -1.42 f$ | $(d_4) = 0.021 f$ | 1.717 (N) |
| $(R_4')(R_4') = +0.36 f$ | $(a_{45}) = 0.200 f$ | Air |
| $(R_5) = +1.45 f$ | $(d_5) = 0.082 f$ | 1.620 (Hgl) |
| $(R_5') = -0.50 f$ | | |

7. In an objective as recited in claim 1, the following rounded-off data for a unit focal length $f$, where the glass properties are characterized by the average refractive index ($n_d$) and the Abee number ($v$) for the color dispersion, while the relative aperture is $f:1.95$:

| Radii | Crest distance | Glass properties |
|---|---|---|
| $(R_1) = -1.794 f$ | $(d_1) = 0.0825 f$ | 1.6203/60.3 (F) |
| $(R_1') = -1.661 f$ | $(a_{12}) = 0.0021 f$ | Air |
| $(R_2) = +0.916 f$ | $(d_2) = 0.0814 f$ | 1.6203/60.3 |
| $(R_2') = -4.031 f$ | $(a_{23}) = 0.0053 f$ | Air (J) |
| $(R_3)(R+) = +0.449 f$ | $(d_3) = 0.2008 f$ | 1.6203/60.3 |
| $(R_3') = +0.661 f$ | $(a_{34}) = 0.0476 f$ | Air |
| $(R_4) = -1.472 f$ | $(d_4) = 0.0211 f$ | 1.7180/29.5 (N) |
| $(R_4')(R_N') = +0.345 f$ | $(a_{45}) = 0.2008 f$ | Air |
| $(R_5) = +1.575 f$ | $(d_5) = 0.0846 f$ | 1.6203/60.3 (Hgl) |
| $(R_5') = -0.484 f$ | | |

8. In an objective as recited in claim 1, the following rounded-off data for a unit focal length $f$, where the glass is indicated according to its average refractive index ($n_d$) and the relative aperture is $f:3.5$:

| Radii | Crest distance | Glass properties |
|---|---|---|
| $(R_1) = -1.607$ | $(d_1) = 0.046 f$ | 1.5523 (F) |
| $(R_1') = -1.740 f$ | $(a_{12}) = 0.002 f$ | Air |
| $(R_2)(R+) = +0.311 f$ | $(d_2) = 0.048 f$ | 1.5895 |
| $(R_2') +0.918 f$ | $(a_{23}) = 0.001 f$ | Air |
| $(R_3) = +0.366 f$ | $(d_3) = 0.090 f$ | 1.6131 (J) |
| $[(R_{3a})](R_3') = -0.366 f$ | 0 | |
| $[(R_{3b})](R_4) = -0.366 f$ | $(d_4) = 0.010 f$ | 1.5895 |
| $[(R_3')](R_4') = +1.220 f$ | | |
| $[(R_4)](R_5) = -2.174 f$ | $(a_{45}) = 0.017 f$ | Air |
| $[(R_N')]R_4')(R_5') = +0.216 f$ | $(d_5) = 0.018 f$ | 1.6490 (N) |
| $[(R_5)](R_6) = +0.935 f$ | $(a_{56}) = 0.134 f$ | Air |
| $[(R_5')](R_6') = -1.298 f$ | $(d_6) = 0.048 f$ | 1.6385 (Hgl) |

9. In an objective as recited in claim 1, the following rounded-off data for a unit focal length $f$, where the glass is indicated according to its average refractive index ($n_d$) and the relative aperture is $f:3.0$:

| Radii | Crest distance | Glass properties |
|---|---|---|
| $(R_1') = -1.85 f$ | $(d_1) = 0.0485 f$ | 1.5523 (F) |
| $(R_1') = -1.71 f$ | $(a_{12}) = 0.0020 f$ | Air |
| $(R_2) (R+) = +0.33 f$ | $(d_2) = 0515 f$ | 1.5895 |
| $(R_2') = +0.97 f$ | $(a_{23}) = 0.0010 f$ | Air |
| $(R_3) = +0.39 f$ | $(d_3) = 0.0959 f$ | 1.6131 (J) |
| $[(R_{3a})](R_3') = -0.39 f$ | 0 | |
| $[(R_{3b})](R_4) = -0.39 f$ | $(d_4) = 0.0101 f$ | 1.5895 |
| $[R_3'](R_4') = +1.29 f$ | $(a_{45}) = 0.0182 f$ | Air |
| $[(R_4)](R_5) = -2.31 f$ | $(d_5) = 0.0192 f$ | 1.6490 |
| $(R_4') (R_4')] (R_N') (R_5') = +0.23 f$ | $(a_{56}) = 0.1424 f$ | Air |
| $(R_5)] (R_6) = +0.99 f$ | $(d_6) = 0.0515 f$ | 1.6203 (Hgl) |
| $(R_5)] (R_6') = -1.25 f$ | | |

10. In an objective as recited in claim 1, the following rounded-off data for a unit focal length $f$, where the glass is indicated according to its average refractive index ($n_d$) and the relative aperture is $f{:}1.94$:

| Radii | Crest distance | Glass properties | |
|---|---|---|---|
| $(R_1) = -2.20\ f$ | $(d_1) = 0.084\ f$ | 1.713 | (F) |
| $(R_1') = -2.01\ f$ | $(a_{12}) = 0.002\ f$ | Air | |
| $(R_2) = +0.92\ f$ | $(d_2) = 0.083\ f$ | 1.620 | |
| $(R_2') = -5.38\ f$ | $(a_{23}) = 0.005\ f$ | Air | (J) |
| $(R_3)(R+) = +0.48\ f$ | $(d_3) = 0.161\ f$ | 1.613 | |
| $[(R_{3a})](R_3') = +2.20\ f$ | $(a_{34}) = 0.001\ f$ | Air | |
| $[(R_{3b})](R_4) = +2.20\ f$ | $(d_4) = 0.041\ f$ | 1.615 | |
| $[(R_3)](R_4') = +0.75\ f$ | $(a_{45}) = 0.048$ | Air | |
| $[(R_4)](R_5) = -1.45\ f$ | $(d_5) = 0.022\ f$ | 1.717 | (N) |
| $[(R_4')](R_5')(R_N') = +0.37\ f$ | $(a_{56}) = 0.204\ f$ | Air | |
| $[(R_5)](R_6) = +1.63\ f$ | $(d_6) = 0.070\ f$ | 1.658 | (Hgl) |
| $[(R_5')](R_6') = -0.53\ f$ | | | |

11. In an objective as recited in claim 1, the following rounded-off data for a unit focal length $f$, where the glass is indicated according to its average refractive index ($n_d$) and the relative aperture is $f{:}1.94$:

| Radii | Crest distance | Glass properties | |
|---|---|---|---|
| $(R_1) = -2.015\ f$ | $(d_1) = 0.0838\ f$ | 1.7130 | (F) |
| $(R_1') = -2.026\ f$ | $(a_{12}) = 0.0021\ f$ | Air | |
| $(R_2) = +0.868\ f$ | $(d_2) = 0.0827\ f$ | 1.6203 | |
| $(R_2') = -4.262\ f$ | $(a_{23}) = 0.0054\ f$ | Air | (J) |
| $(R_3)(R+) = +0.471\ f$ | $(d_3) = 0.1611\ f$ | 1.6130 | |
| $(R_3') = +2.010\ f$ | $(a_{34}) = 0.0013\ f$ | Air | |
| $(R_4) = +2.625\ f$ | $(d_4) = 0.0409\ f$ | 1.6150 | |
| $(R_4') = +0.712\ f$ | $(a_{45}) = 0.0483\ f$ | Air | (N) |
| $(R_5) = -1.595\ f$ | $(d_5) = 0.0215\ f$ | 1.7174 | |
| $(R_5')(R_N') = +0.360\ f$ | $(a_{56}) = 0.2040\ f$ | Air | |
| $(R_6) = +1.467\ f$ | $(d_6) = 0.0698\ f$ | 1.6585 | (Hgl) |
| $(R_6') = -0.536\ f$ | | | |

* * * * *